United States Patent
Kim et al.

(10) Patent No.: US 12,091,360 B2
(45) Date of Patent: Sep. 17, 2024

(54) CONCRETE STRUCTURE REPAIRED AND REINFORCED USING TEXTILE GRID REINFORCEMENT AND HIGHLY DURABLE INORGANIC BINDER AND METHOD OF REPAIRING AND REINFORCING THE SAME

(71) Applicant: KOREA INSTITUTE OF CIVIL ENGINEERING AND BUILDING TECHNOLOGY, Gyeonggi-do (KR)

(72) Inventors: Hyeong Yeol Kim, Gyeonggi-do (KR); Gum Sung Ryu, Gyeonggi-do (KR); Kyung Taek Koh, Gyeonggi-do (KR); Young Jun You, Gyeonggi-do (KR); Gi Hong An, Gyeonggi-do (KR)

(73) Assignee: KOREA INSTITUTE OF CIVIL ENGINEERING AND BUILDING TECHNOLOGY, Gyeonggi-do (KR)

( * ) Notice: Subject to any disclaimer, the term of this patent is extended or adjusted under 35 U.S.C. 154(b) by 681 days.

(21) Appl. No.: 17/324,129

(22) Filed: May 19, 2021

(65) Prior Publication Data

US 2022/0089489 A1    Mar. 24, 2022

(30) Foreign Application Priority Data

Sep. 22, 2020  (KR) ........................ 10-2020-0122544

(51) Int. Cl.
*C04B 20/00*    (2006.01)
*C04B 20/10*    (2006.01)
(Continued)

(52) U.S. Cl.
CPC ...... *C04B 20/0068* (2013.01); *C04B 20/1066* (2013.01); *C04B 22/10* (2013.01);
(Continued)

(58) Field of Classification Search
CPC ........... C04B 2111/723; C04B 2111/72; C04B 20/0068; C04B 20/1066; C04B 22/10;
(Continued)

(56) References Cited

U.S. PATENT DOCUMENTS 11,193,278 B2 *  12/2021  Kim ................... E04G 23/0233
2015/0167332 A1 *  6/2015  Shiota ................. E04G 23/0218
                                                              52/514

FOREIGN PATENT DOCUMENTS

CN    101679120 A  *  3/2010  ......... C04B 24/2647
KR    102003670 B1 *  7/2019
(Continued)

*Primary Examiner* — Babajide A Demuren
(74) *Attorney, Agent, or Firm* — JCIPRNET

(57) ABSTRACT

Provided are a concrete structure repaired and reinforced using a textile grid reinforcement and a highly durable inorganic binder and a method of repairing and reinforcing the same, capable of easily repairing and reinforcing an old concrete structure by adhering a textile grid reinforcement, which is coated with a coating material to improve adhesiveness, to the old concrete structure and by adhering a textile grid reinforcement selectively using a highly durable inorganic binder having chloride penetration resistance performance or chemical resistance performance according to a use environment and a reinforcement purpose, that is, by adhering a textile grid reinforcement using an inorganic binder such as cement in place of an organic adhesive. Further, the concrete structure has excellent refractory performance because both the textile grid reinforcement such as a carbon fiber and the highly durable inorganic binder are incombustible materials, and can be effectively applied to reinforcing facilities exposed to the danger of fire.

9 Claims, 20 Drawing Sheets

(51) Int. Cl.
     *C04B 22/10*           (2006.01)
     *C04B 28/08*           (2006.01)
     *E04G 23/02*           (2006.01)
     *C04B 103/00*          (2006.01)
     *C04B 111/21*          (2006.01)
     *C04B 111/72*          (2006.01)

(52) U.S. Cl.
     CPC ........ *C04B 28/082* (2013.01); *E04G 23/0203* (2013.01); *E04G 23/0218* (2013.01); *C04B 2103/0078* (2013.01); *C04B 2111/21* (2013.01); *C04B 2111/723* (2013.01)

(58) Field of Classification Search
     CPC .......... C04B 28/082; C04B 2103/0078; C04B 2111/21; E04G 23/0203; E04G 23/0218
     See application file for complete search history.

(56) References Cited

FOREIGN PATENT DOCUMENTS

| | | | |
|---|---|---|---|
| KR | 102104034 B1 | * | 4/2020 |
| KR | 102156131 B1 | * | 9/2020 |
| KR | 102193762 B1 | * | 12/2020 |
| KR | 102216939 B1 | * | 2/2021 |

\* cited by examiner

| Type | | Chloride penetration resistant mortar Composition ratio(parts by weight) | Remarks |
|---|---|---|---|
| Binder | Cement | 100 parts by weight | |
| | Chloride penetration resistant binder | 100 parts by weight | - Mixing 90 to 95 wt% of fine blast furnace slag powder and 5 to 10 wt% of salt adsorbent<br>- Salt adsorbent is calcium carbonate |
| Fine aggregate | | 210~250 parts by weight | |
| Mixing water | | 55~65 parts by weight | |
| High-performance water reducing admixture | | 1.5~3 parts by weight | |

FIG. 11

| Type | | Chemical resistant mortar Composition ratio(parts by weight) | Remarks |
|---|---|---|---|
| Binder(B) | Fine blast furnace slag powder | 100 parts by weight | - Cement-free binder<br>- Highly durable binder with chemical resistance performance |
| | Fly ash | 35~45 parts by weight | - Cement-free binder<br>- Highly durable binder with chemical resistance performance |
| Fine aggregate(S) | | 165~180 parts by weight | - S/B is 1.2 |
| Mixing water(W) | | 55~65 parts by weight | - W/B is 0.45 |
| Alkali activator(Act.) | | 8~20 parts by weight | - Act./W is 0.24<br>- Alkali activator |

FIG. 12

CONCRETE STRUCTURE REPAIRED AND REINFORCED USING TEXTILE GRID REINFORCEMENT AND HIGHLY DURABLE INORGANIC BINDER AND METHOD OF REPAIRING AND REINFORCING THE SAME

CROSS-REFERENCE TO RELATED APPLICATION

This application claims priority to and the benefit of Korean Patent Application No. 10-2020-0122544, filed on Sep. 22, 2020, the disclosure of which is incorporated herein by reference in its entirety.

BACKGROUND

1. Field of the Invention

The present invention relates to a method of repairing and reinforcing an old concrete structure and, more particularly, to a concrete structure repaired and reinforced using a textile grid reinforcement and a highly durable inorganic binder and a method of repairing and reinforcing the same, capable of repairing and reinforcing an old concrete structure using a highly durable inorganic binder having chloride penetration resistance performance or chemical resistance performance according to a use environment and a reinforcement purpose and a textile grid reinforcement having improved adhesiveness.

2. Discussion of Related Art

According to data on the current state of infrastructure in Korea as of 2020, when facilities are considered old based on 30 years after completion, 37% of infrastructure such as bridges, tunnels, and subways are old facilities, and this is expected to rise to 80% in the next 20 years. However, since these old facilities cannot be replaced at once due to reasons such as a budget shortage, the old facilities should be subjected to inspection and maintenance at any time. Especially, it is necessary to secure the safety of facilities and prolong the service lives thereof by performing performance improvement work for facilities whose structural performance is insufficient.

In addition to the infrastructure such as bridges, tunnels, and subways, 90% or more of facilities such as houses and apartments are constructed of reinforced concrete. At present, various reinforcing methods are applied to repair old concrete facilities. Among the reinforcing methods, a fiber reinforcement adhering method of adhering a sheet, a strip, a panel, etc. formed of a high-strength carbon fiber, an aramid fiber, or the like to an existing structure is most commonly used.

Meanwhile, FIG. 1A to 1C are photographs illustrating a fiber reinforcement adhering method, according to the related art, of adhering a carbon fiber sheet to a structure. FIG. 1A is a photograph illustrating how to adhere a carbon fiber sheet 20 to a structure 10. FIG. 1B is a photograph illustrating how to adhere a carbon fiber sheet 20 to a pillar 10a in order to reinforce the pillar. FIG. 1C is a photograph illustrating how to adhere a carbon fiber sheet 20 to a building ceiling 10b in order to reinforce a building slab.

As illustrated in FIGS. 1A to 1C, an existing old structure reinforcing method of utilizing a high-strength carbon fiber according to the related art is a method of applying an organic adhesive such as an epoxy resin to a structure 10 first, and adhering a fiber sheet such as a carbon fiber sheet 20 or a panel onto the organic adhesive.

However, the organic adhesive used in the fiber reinforcement adhering method according to the related art is vulnerable to fire, and thus may burn at high temperature and lose adhesiveness. Further, because most facilities such as underground structures are exposed to rainwater or the like, surfaces thereof easily become wet, and there is a disadvantage in that this organic adhesive cannot be applied on the surfaces of the wet structures. Thus, in the case where an adhered portion is exposed to moisture due to the leakage of water after the organic adhesive is applied, there is a problem in that the adhered portion may lose adhesiveness and a fiber reinforcement may be separated.

Meanwhile, an invention entitled "Repairing and reinforcing method of concrete floor" is disclosed in Korean Patent No. 10-1740906 as the prior art, and will be described with reference to FIGS. 2A and 2B.

FIG. 2A is a configuration diagram illustrating a structure to which a method of repairing and reinforcing a concrete floor according to the related art is applied, and FIG. 2B is a plan view illustrating an anchorage for the method of repairing and reinforcing a concrete floor illustrated in FIG. 2A.

Referring to FIG. 2A, the method of repairing and reinforcing a concrete floor according to the related art includes: an operation of chipping a concrete floor 70; an operation of washing the chipped concrete floor 70 with high pressure; an operation of applying an adhesive 30 to the washed concrete floor 70; an operation of installing a reinforcement grid 40 on the concrete floor to which the adhesive 30 is applied; an operation of fixing the installed reinforcement grid 40 to the floor using an anchorage 50, and an operation of pouring underwater micro concrete 60 on the concrete floor 70 to which the reinforcement grid 40 is fixed.

Here, the anchorage 50 is an upright support member that is installed on the concrete floor 70 so as to fix the reinforcement grid 40 at a predetermined distance from the concrete floor 70. As illustrated in FIGS. 2A and 2B, the anchorage 50 is an easy spacer anchorage that includes embedding pieces 51, a support piece 52, and a fixing piece 53.

Specifically, as illustrated in FIGS. 2A and 2B, the anchorage 50 includes the support piece 52 that is supported at an upper portion of the floor and supports a lower portion of a cross portion of a grid-shaped reinforcement grid, the embedding pieces 51 that are embedded in the floor so as to fix the support piece 52 to the floor, and the fixing piece 53 that is installed at an upper portion of the support piece 52 and fixes the reinforcement grid 40.

Further, as illustrated in FIGS. 2A and 2B, a plurality of fixing holes 52a, into which the embedding pieces 51 are inserted, fastened, and fixed, are formed around the upper portion of the support piece 52 so as to pass through the support piece 52 in a vertical direction. Linear fitting grooves 52b, to which the cross portion of the grid-shaped reinforcement grid is fitted, are formed on an upper surface of the support piece 52 so as to cross each other, and a coupling operation 52c for coupling with the fixing piece protrudes around an outer circumference of the support piece 52.

According to the method of repairing and reinforcing a concrete floor according to the related art, the concrete floor is repaired and reinforced by fixing the reinforcement grid 40 to the concrete floor 70 using the anchorage 50 and pouring the underwater micro concrete 60, and thereby repairing performance and reinforcing strength of the concrete floor 70 can be improved. Further, the concrete floor is configured to be reinforced by the reinforcement grid 40, and thereby coupling and mixing characteristics between the reinforcement grid 40 and the underwater micro concrete 60 can be improved.

Further, according to the method of repairing and reinforcing a concrete floor according to the related art, the upright anchorage 50 is installed on the concrete floor 70 such that the reinforcement grid 40 is fixed at a predetermined distance from the floor, and thereby an embedded depth of the reinforcement grid 40 can be constantly maintained by spacing the reinforcement grid 40 apart from the concrete floor 70 by a predetermined distance. Further, the anchorage 50 includes the embedding pieces 51, the support piece 52, and the fixing piece 53, and thereby a separation distance of the reinforcement grid 40 can be adjusted according to a poured height of the underwater micro concrete 60, and the reinforcement grid 40 can be fixed.

As described above, in the case of the method of repairing and reinforcing a concrete floor according to the related art, by chipping and then washing the concrete floor 70, applying the adhesive 30, installing the reinforcement grid 40, fixing the reinforcement grid 40 to the floor using the anchorage 50, and pouring and reinforcing the underwater micro concrete 60 on an upper surface of the reinforcement grid 40, repairing performance and reinforcing strength of the concrete floor 70 can be improved. However, in the case of the method of repairing and reinforcing a concrete floor according to the related art, since this method is a method of applying a separate adhesive 30 in order to fix the reinforcement grid 40, in the case where, after the adhesive 30 is applied, an adhered portion is exposed to moisture due to leakage of water, there is a problem in that the adhesive 30 may lose adhesiveness and the reinforcement grid 40 may be separated.

Meanwhile, an invention entitled "Method of repairing and reinforcing concrete structure using high strength mortar composition and stiffener" is disclosed in Korean Patent No. 10-1972265 as another prior art and will be described with reference to FIGS. 3A and 3B.

FIG. 3A is a front view illustrating a wire mesh member applied in a method of repairing and reinforcing a concrete structure according to the related art, and FIG. 3B is a view illustrating a state in which the wire mesh member is constructed by the method of repairing and reinforcing a concrete structure according to the related art.

Referring to FIGS. 3A and 3B, the method of repairing and reinforcing a concrete structure according to the related art includes: a) a foundation repairing operation of trimming and surface-treating a repair work surface 91a of a concrete structure 91 to be repaired; b) a wire mesh attaching operation of disposing a wire mesh member 80 formed of stainless steel and steel on the work surface 91a after the foundation repairing operation and fixing the wire mesh member 80 to the work surface 91a with bolts; c) a reinforcement layer forming operation of forming and hardening a reinforcement layer 92 such that the wire mesh member 80 is embedded by applying mortar for repairing and reinforcing a concrete structure to the construction surface 91a; and d) a coating layer forming operation of applying and coating a surface protective agent on a surface of the formed reinforcement layer 92.

Here, the wire mesh member 80 includes wires 81 formed of a metal, and numerous connecting panels 82 that are formed of a metal for fixing the wires 81 and are thin sheets. In this case, a steel plate, an aluminum plate, or an alloy plate bent by pressing under pressure may be used for the connecting panels 82.

Specifically, as illustrated in FIGS. 3A and 3B, each of the connecting panels 82 is made up of: numerous fastening holes 82a that are provided in a lengthwise direction such that bolts are fastened; fixing wings 82b that are provided on both sides of the connecting panel 82 so as to fix each wire 81 such that one ends thereof are connected and are bent while surrounding each wire 81; and support legs 82c that are provided at the connecting panel 82, are disposed between the fixing wings 82b, have bending lines, are bent downward from bending lines, and are supported on the work surface 91a. Here, the bending lines are long grooves that are pressed and formed by a press such that bending is made easy.

Accordingly, as illustrated in FIG. 3B, the support legs 82c are formed long in a lengthwise direction, and are not distorted or warped even if bolts are fastened and the connecting panel 82 is pressed toward the work surface 91a. Further, the fixing wings 82b and the support legs 82c are alternately provided on the connecting panel 82 to be able to fix the wires 81 disposed at regular intervals.

Further, the mortar for repairing and reinforcing a concrete structure includes, with respect to 100 parts by weight of cement, 1 to 10 parts by weight of a polymer, 0.1 to 8 parts by weight of silica fume, 0.5 to 5.0 parts by weight of a ceramic composite fiber, 1 to 8 parts by weight of a strength enhancer, 30 to 50 parts by weight of aggregate, 0.5 to 2.0 parts by weight of an anti-shrinkage agent, 3 to 7 parts by weight of a poly(vinyl alcohol) (PVA) powder resin, 0.1 to 1.0 parts by weight of a defoamer, 5 to 10 parts by weight of an expansion agent, 1 to 5 parts by weight of a powdered silicon water repellent agent, 5 to 15 parts by weight of a durability enhancing agent, 1 to 15 parts by weight of a limestone powder component, and 0.1 to 2 parts by weight of a nano metal oxide powder.

Further, the application of the surface protective agent includes d-1) an operation of applying a primary surface protective agent including an acrylic resin, a rubber chip, aerogel, and a powder component, and d-2) an operation of applying a secondary surface protective agent including 100 parts by weight of a liquid component including a methyl methacrylate (MMA) resin and 30 to 300 parts by weight of an inorganic power component after the primary surface protective agent is applied.

Further, the durability enhancing agent is characterized by mixing a first composition including 30 to 40 parts by weight of a hardening promoter, 1 to 3 parts by weight of a montmorillonite clay mineral, 1 to 2 parts by weight of an aluminum salt, and 50 to 60 parts by weight of water, and a second composition including 5 to 7 parts by weight of a hardening accelerator, 12 to 18 parts by weight of a clay mineral, 0.1 to 2 parts by weight of a nano zinc powder, 0.1 to 0.5 parts by weight of a stabilizer, and 60 to 70 parts by weight of water.

Further, the nano metal oxide powder has a porous structure, and a surface thereof is coated with graphite oxide.

The method of repairing and reinforcing a concrete structure according to the related art is characterized in that, because a water repellent effect is excellent and water absorption can be kept low when a damaged portion of a degraded concrete structure is repaired and reinforced, durability is excellent and physical properties such as compressive strength, flexural strength, etc. are excellent, repairing and reinforcing work for a concrete structure is very excellent by reducing a unit weight of mortar and improving initial and long-term adhering performance, the method is eco-friendly because an organic solvent is not used, various types of stress can be uniformly absorbed because the mortar can be densely formed, and the mortar is easily poured and can be firmly fixed, surface strength and water resistance are excellent, and resistance to freezing and thawing is excellent because a stainless steel reinforcement fixed to the construction surface is used.

The method of repairing and reinforcing a concrete structure according to the related art is a method of making mortar for repairing and reinforcing a concrete structure, which is composed of silica fume, a ceramic composite fiber, a strength enhancer, aggregate, an anti-shrinkage agent, a poly(vinyl alcohol) powder resin, a defoamer, an expansion agent, a powdered silicon water repellent agent, a durability enhancing agent, a limestone powder component, a nano metal oxide powder, and an alkali activator, and embedding the wire mesh member 80 in a concrete reinforcing surface and then pouring the mortar for repairing and reinforcing a concrete structure to form a reinforcing layer.

However, since the method of repairing and reinforcing a concrete structure according to the related art is a method of increasing a load carrying capacity of the concrete structure using a stainless steel wire mesh assembled in a grid form, in the case where the concrete structure is repaired/reinforced using the wire mesh, quality may be depend on a state of tension of the wire mesh attached to the concrete structure. In addition, there is a disadvantage that a repairing/reinforcing effect is reduced because it is not easy to secure a tensile force of the wire mesh.

PRIOR ART DOCUMENTS

[Patent Document]

(Patent Document 0001) Korean Patent No. 10-1740906 (registered on May 23, 2017, and entitled "Repairing and reinforcing method of concrete floor")

(Patent Document 0002) Korean Patent No. 10-1972265 (registered on Apr. 18, 2019, and entitled "Method of repairing and reinforcing concrete structure using high strength mortar composition and stiffener")

(Patent Document 0003) Korean Patent No. 10-2133511 (registered on Jul. 7, 2020, and entitled "Underwater non-separable cement-mortar composition and reinforcement method for underwater structures using the same")

(Patent Document 0004) Korean Patent No. 10-895497 (registered on Apr. 22, 2009, and entitled "Cement-mortar composition for preventing concrete structure neutralization and chloride penetration and method of repairing and reinforcing structure using the same")

SUMMARY OF THE INVENTION

To solve the aforementioned problems, the technical problem to be solved by the present invention is directed to providing a repairing and reinforcing concrete structure and method using a textile grid reinforcement and a highly durable inorganic binder, capable of repairing and reinforcing an old concrete structure by adhering the textile grid reinforcement, which is coated with a coating material to improve adhesiveness, to the old concrete structure, and particularly by adhering the textile grid reinforcement using selectively a highly durable inorganic binder having chloride penetration resistance performance or chemical resistance performance according to a use environment and a reinforcement purpose.

As means for accomplishing the above technical problem, a method of repairing and reinforcing a concrete structure using a textile grid reinforcement and a highly durable inorganic binder according to the present invention includes: a) forming a textile grid reinforcement coated with a coating material to improve adhesiveness with an old concrete structure; b) mixing and making a highly durable inorganic binder according to a use environment of the old concrete structure and repair and reinforcement purposes; c) pouring shotcrete formed of the highly durable inorganic binder on a surface of the old concrete structure to form a primary mortar layer; d) placing the textile grid reinforcement at an upper portion of the primary mortar layer; e) fixing the textile grid reinforcement to the old concrete structure using a grid fixing unit; f) pouring shotcrete formed of the highly durable inorganic binder on the textile grid reinforcement to form a secondary mortar layer; and g) hardening the secondary mortar layer to complete repairing and reinforcing of the old concrete structure, wherein the highly durable inorganic binder of the operation b) is a chloride penetration resistant inorganic binder having chloride penetration resistance performance or a chemical resistant inorganic binder having chemical resistance performance.

Here, in the case where a degraded portion is present in the old concrete structure, the degraded portion may be previously removed from the old concrete structure prior to performing the operation c), and in the case where a reinforcing bar embedded in the old concrete structure is corroded, a degraded cross section can be removed up to a depth of the reinforcing bar, and an additional reinforcing bar may be arranged if necessary.

Further, before the operation e), the textile grid reinforcement is preferably pulled from both sides thereof to introduce a tensile force such that the textile grid reinforcement is horizontally maintained.

Further, in the operation e), the grid fixing unit may be driven into the old concrete structure by an explosive or pneumatic tacker such that the textile grid reinforcement can be firmly fixed to the old concrete structure.

Meanwhile, as another means for accomplishing the above technical problem, a method of repairing and reinforcing a concrete structure using a textile grid reinforcement and a highly durable inorganic binder according to the present invention includes: a) forming a textile grid reinforcement coated with a coating material to improve adhesiveness with an old concrete structure; b) mixing and making a highly durable inorganic binder according to a use environment of the old concrete structure and repair and reinforcement purposes; c) placing the textile grid reinforcement on a surface of the old concrete structure; d) fixing the textile grid reinforcement to the old concrete structure using a grid fixing unit; e) pouring shotcrete formed of the highly durable inorganic binder on the textile grid reinforcement to form a mortar layer in which the textile grid reinforcement is embedded; and f) hardening the mortar layer to complete repairing and reinforcing of the old concrete structure, wherein the highly durable inorganic binder of the operation b) is a chloride penetration resistant inorganic binder having chloride penetration resistance performance or a chemical resistant inorganic binder having chemical resistance performance.

Meanwhile, as another means for accomplishing the above technical problem, a concrete structure repaired and reinforced using a textile grid reinforcement and a highly durable inorganic binder according to the present invention includes: an old concrete structure to be repaired and reinforced; a textile grid reinforcement adhered to a surface of the old concrete structure to repair and reinforce the old concrete structure and coated with a coating material to improve adhesiveness with the surface of the old concrete structure; a highly durable inorganic binder formulated as an inorganic binder so as to have chloride penetration resistance performance or chemical resistance performance according to a use environment of the old concrete structure and repair and reinforcement purposes, and configured to adhere the textile grid reinforcement to the old concrete structure; and a grid fixing unit configured to fix the textile grid reinforcement when the textile grid reinforcement is placed on the old concrete structure, wherein the highly durable inorganic binder is a chloride penetration resistant inorganic binder having chloride penetration resistance performance or a chemical resistant inorganic binder having chemical resistance performance.

Here, the coating material with which the textile grid reinforcement is coated is an alumina ($Al_2O_3$) powder used as a sandpaper abrasive material, and a particle size of the coating material may be determined according to the type and specifications of the textile grid reinforcement.

Further, the chloride penetration resistant inorganic binder may be formed by mixing 100 parts of weight of cement, 100 parts of weight of a chloride penetration resistant binder, 210 to 250 parts of weight of fine aggregate, 55 to 65 parts of weight of mixing water, and 1.5 to 3 parts of weight of a high-performance water reducing admixture.

Further, the chloride penetration resistant binder may be formed by mixing 90 to 95 wt % of a fine blast furnace slag powder and 5 to 10 wt % of a salt adsorbent, and the salt adsorbent may be calcium carbonate.

Further, the chemical resistant inorganic binder may be a cement-free binder, and formed by mixing 100 parts of weight of a fine blast furnace slag powder, 35 to 45 parts of weight of fly ash, 165 to 180 parts of weight of fine aggregate, 55 to 65 parts of weight of mixing water, and 8 to 20 parts of weight of an alkali accelerator.

Further, the grid fixing unit may include a U-shaped anchor pin as a body driven into the old concrete structure, and a driving impact buffer provided at an upper end of the anchor pin so as to protect the textile grid reinforcement form a driving impact when the anchor pin is driven.

Further, the grid fixing unit may pass through an upper portion of a grid weft and warp intersection when the textile grid reinforcement is placed, and may be fixedly driven into the old concrete structure.

Effects

According to the present invention, an old concrete structure can be easily repaired and reinforced by adhering a textile grid reinforcement, which is coated with a coating material to improve adhesiveness, to the old concrete structure and by adhering a textile grid reinforcement selectively using a highly durable inorganic binder having chloride penetration resistance performance or chemical resistance performance according to a use environment and a reinforcement purpose, that is, by adhering a textile grid reinforcement using an inorganic binder such as cement in place of an organic adhesive.

According to the present invention, because both a textile grid reinforcement (a fiber reinforcement) such as a carbon fiber and a highly durable inorganic binder are incombustible materials, the concrete structure has excellent refractory performance, and particularly can be applied to reinforcing facilities exposed to the danger of fire.

According to the present invention, an inorganic binder that can be constructed for a wet structure or in the winter season is used, and thereby the problem of the adhering method according to the related art can be solved, for instance the concrete structure does not fall off despite a leakage of water. Especially, because the textile grid reinforcement (the fiber reinforcement) such as a carbon fiber is not corroded like a reinforcing bar, road facilities on which a snow-removing agent is used or marine and harbor facilities such as a breakwater exposed to salt can be effectively repaired and reinforced.

BRIEF DESCRIPTION OF THE DRAWINGS

The above and other objects, features and advantages of the present invention will become more apparent to those having ordinary skill in the art by describing in detail exemplary embodiments thereof with reference to the accompanying drawings, in which:

FIG. 11 is a view illustrating a composition of chloride penetration resistant mortar in the concrete structure repaired and reinforced using a textile grid reinforcement and a highly durable inorganic binder according to an embodiment of the present invention;

FIG. 12 is a view illustrating a composition of chemical resistant mortar in the concrete structure repaired and reinforced using a textile grid reinforcement and a highly durable inorganic binder according to an embodiment of the present invention;

DETAILED DESCRIPTION OF EXEMPLARY EMBODIMENTS

Figure 1A:
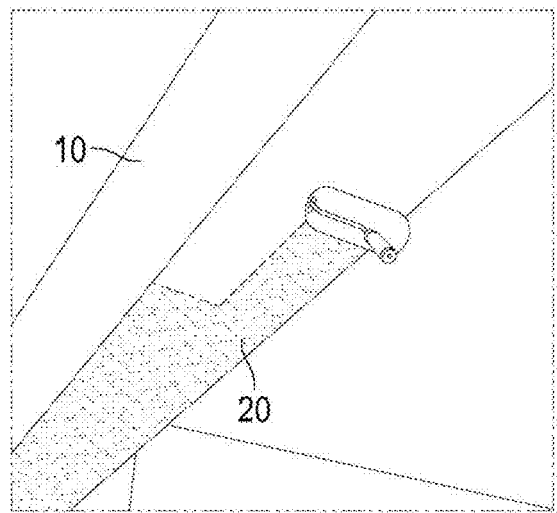
FIG. 1A to 1C are photographs illustrating a method of adhering a fiber reinforcement according to the related art, and particularly how to adhere a carbon fiber sheet to a structure.
Figure 1B:
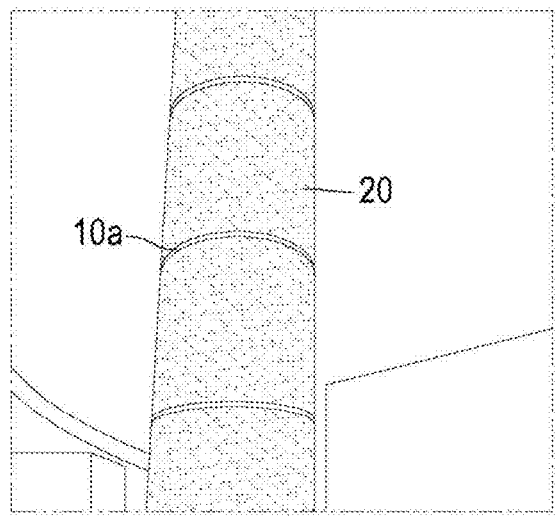
Figure 1C:
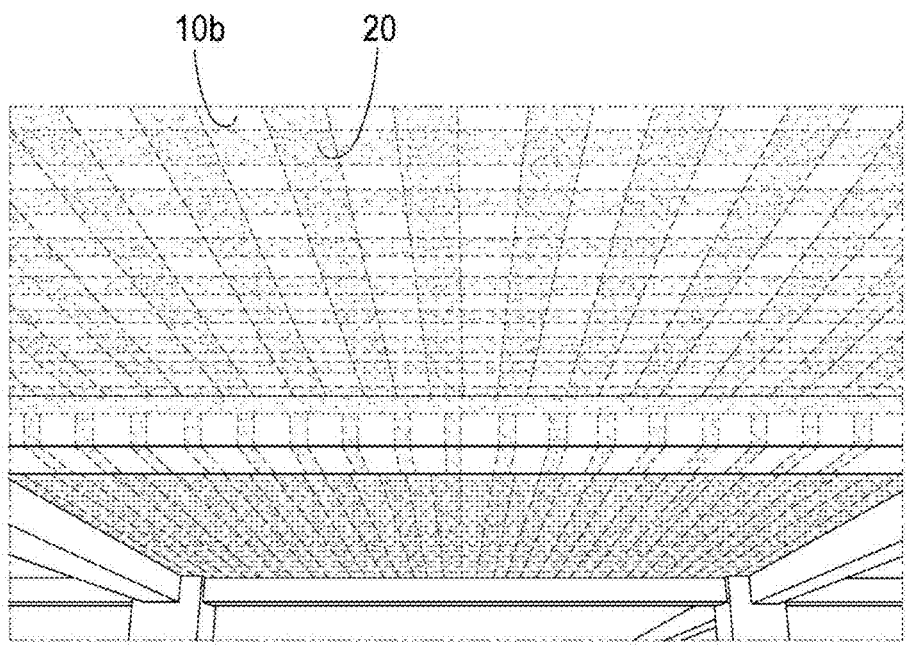
Figure 2A:
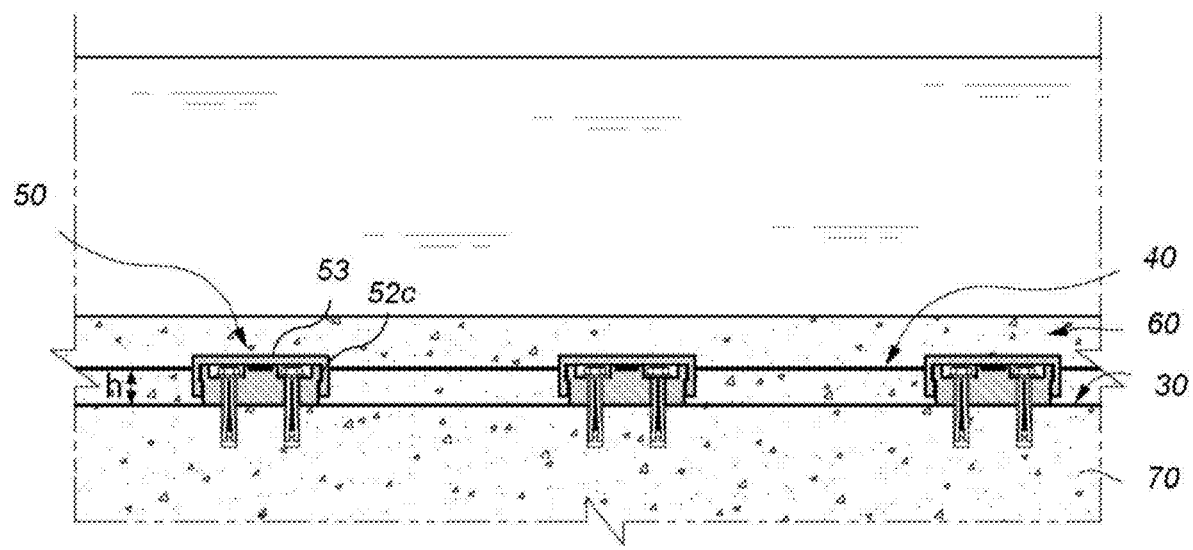
FIG. 2A a configuration diagram illustrating a structure to which a method of repairing and reinforcing a concrete floor according to the related art is applied.
Figure 2B:
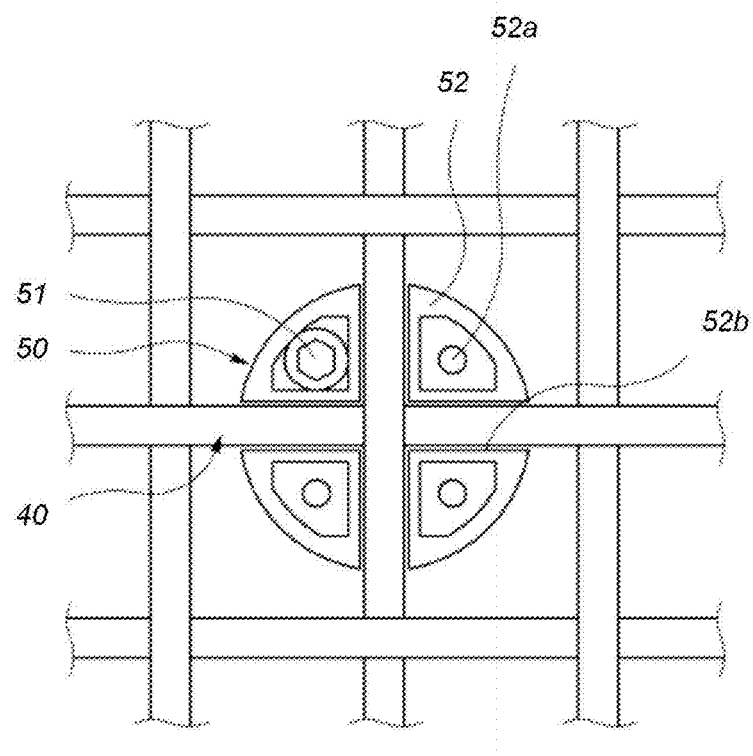
FIG. 2B is a plan view illustrating an anchorage for the method of repairing and reinforcing a concrete floor illustrated in FIG. 2A.
Figure 3A:
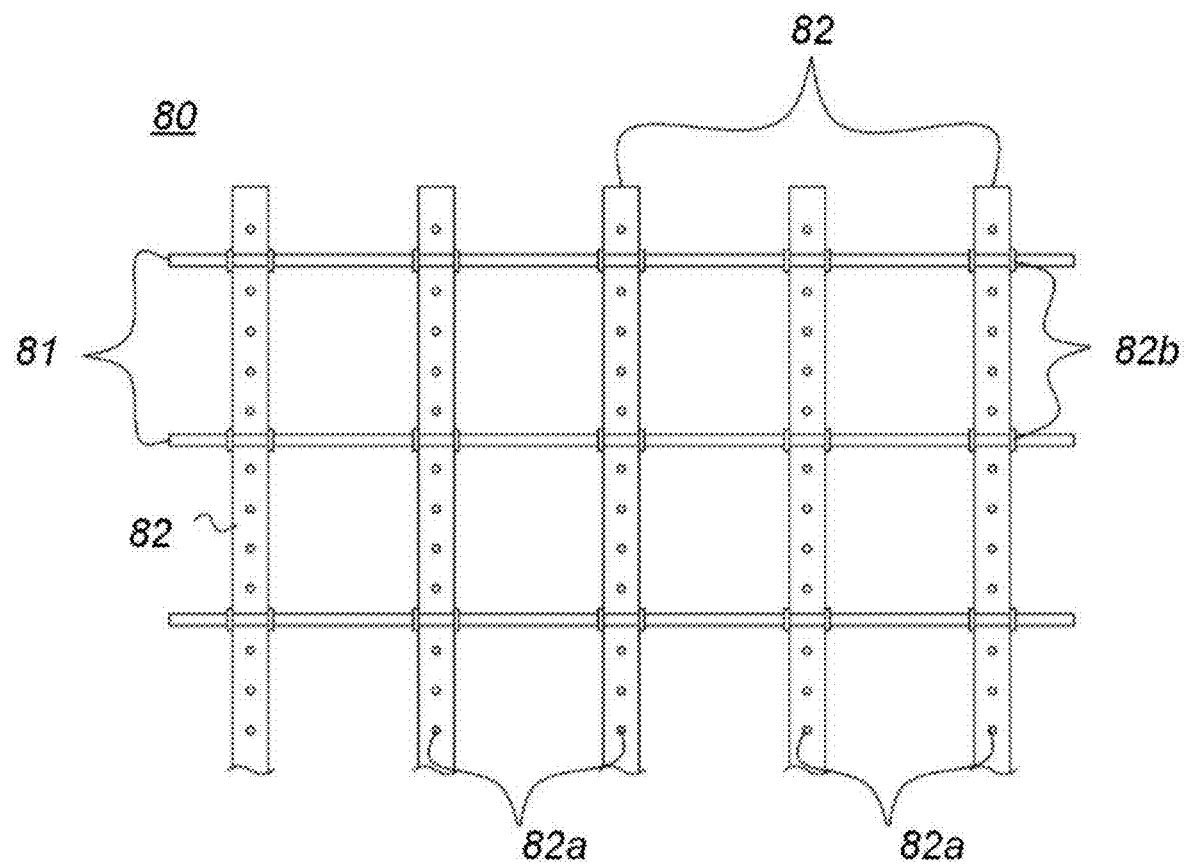
FIG. 3A is a front view illustrating a wire mesh member applied in a method of repairing and reinforcing a concrete structure according to the related art.
Figure 3B:
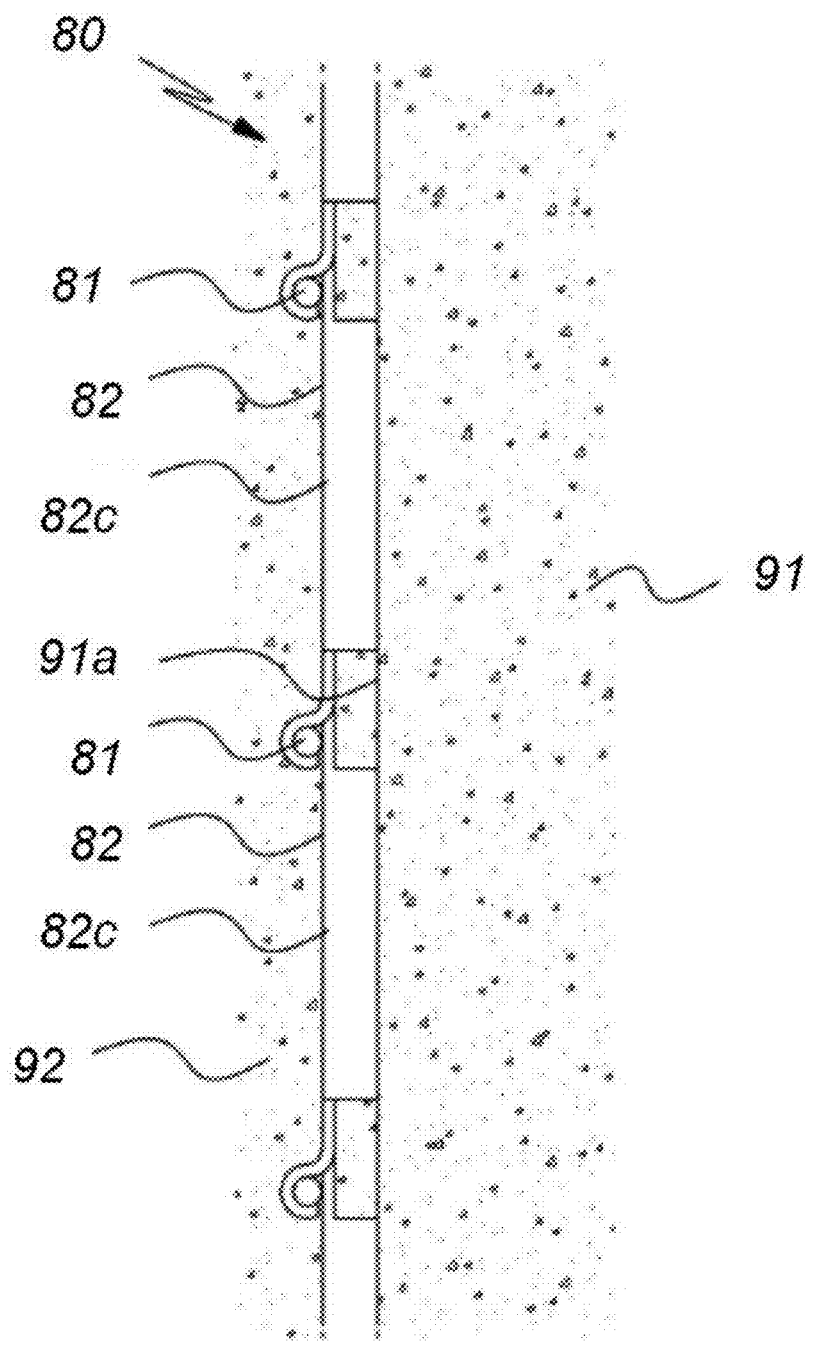
FIG. 3B is a view illustrating a state in which the wire mesh member is constructed by the method of repairing and reinforcing a concrete structure according to the related art.

Hereinafter, embodiments of the present invention will be described in detail with reference to the accompanying drawings so as to be easily carried out by those having ordinary skill in the art to which the present invention pertains. The present invention may, however, be embodied in various forms, and should not be construed as being limited to the embodiments set forth herein. To clearly describe the present invention in the drawings, portions irrelevant to the description are omitted, and similar portions throughout the specification are given similar reference signs.

When any portion "includes" and/or "has" any constituent element throughout the specification, this means that, unless otherwise mentioned, any portion does not preclude another constituent element but can further include another constituent element.

[Concrete Structure 100 Repaired and Reinforced Using Textile Grid Reinforcement and Highly Durable Inorganic Binder]

Figure 4:
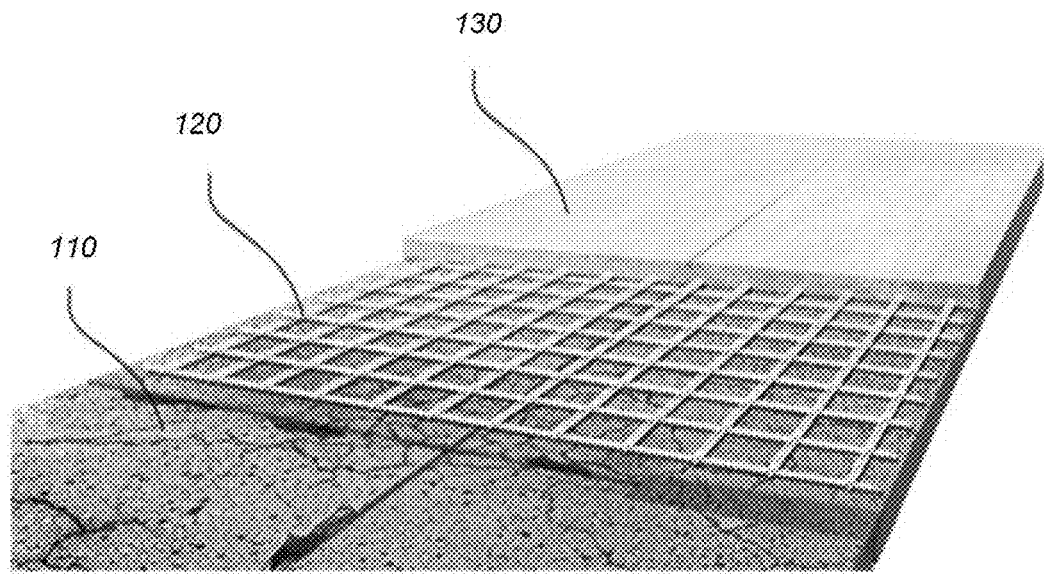
FIG. 4 is a view schematically illustrating a concrete structure repaired and reinforced using a textile grid reinforcement and a highly durable inorganic binder according to an embodiment of the present invention.
Figure 5A:
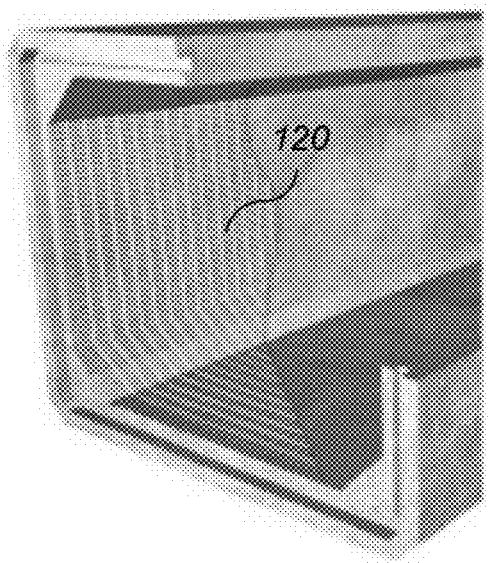
FIGS. 5A and 5B are views illustrating the concrete structure repaired and reinforced using a textile grid reinforcement and a highly durable inorganic binder according to an embodiment of the present invention.
Figure 5B:
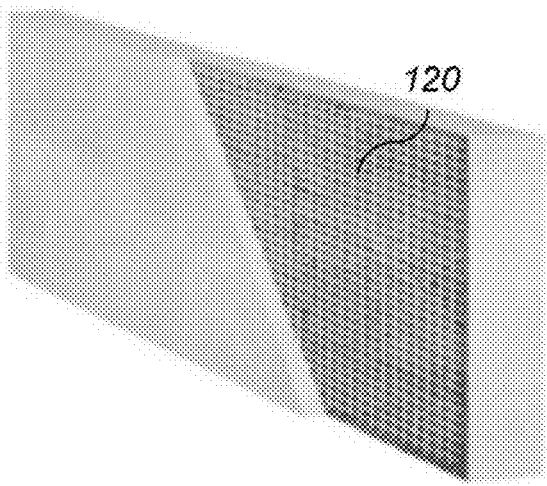

FIG. 4 is a view schematically illustrating a concrete structure repaired and reinforced using a textile grid reinforcement and a highly durable inorganic binder according to an embodiment of the present invention, and FIGS. 5A and 5B are views illustrating the concrete structure repaired and reinforced using a textile grid reinforcement and a highly durable inorganic binder according to an embodiment of the present invention, wherein FIG. 5A illustrates a waste water box reinforced by the textile grid reinforcement, and FIG. 5B illustrates a concrete wall reinforced by the textile grid reinforcement.

Figure 10A:
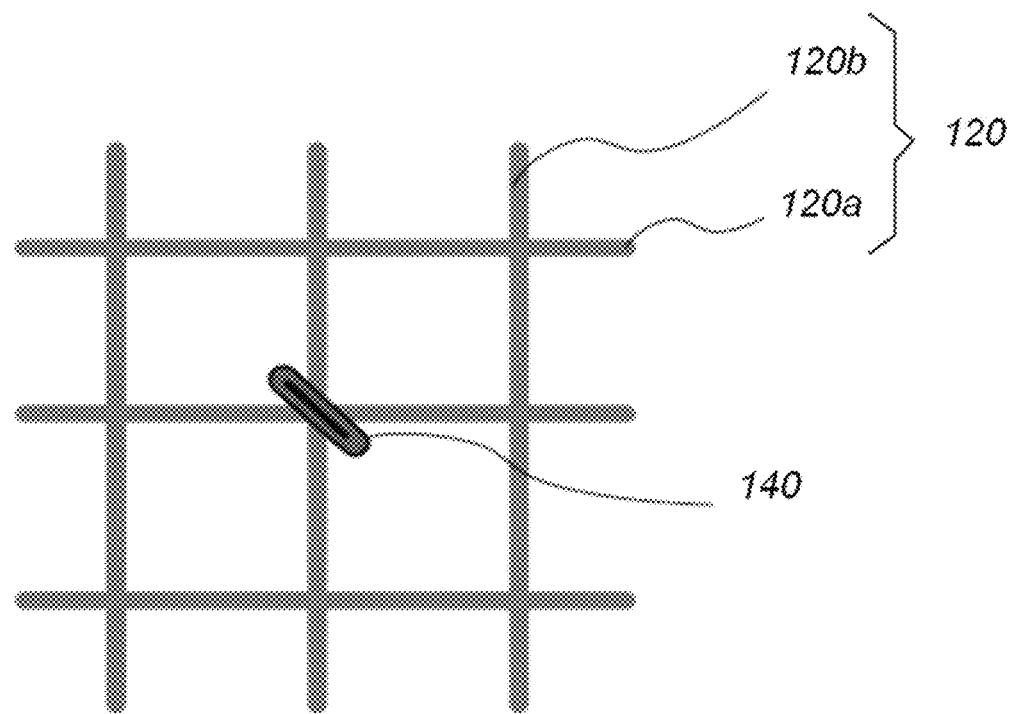
FIG. 10A to 10C are views specifically illustrating a grid fixing unit in the concrete structure repaired and reinforced using a textile grid reinforcement and a highly durable inorganic binder according to an embodiment of the present invention.
Figure 10B:
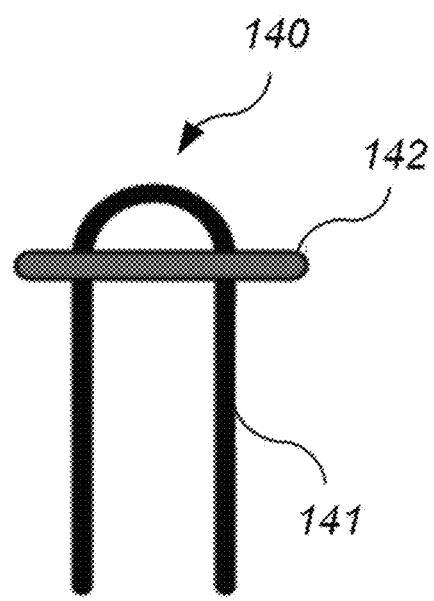
Figure 10C:
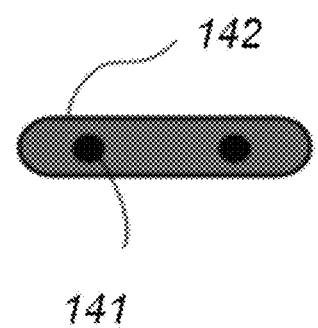

Referring to FIG. 4, a concrete structure 100 repaired and reinforced using a textile grid reinforcement and a highly durable inorganic binder according to an embodiment of the present invention includes an old concrete structure 110, a textile grid reinforcement 120, and a highly durable inorganic binder 130, and further includes a grid fixing unit 140 as illustrated in FIG. 10A to 10C to be described below.

The old concrete structure 110 is a concrete structure from which a degraded portion is pre-removed. In the case where any reinforcing bar embedded in the old concrete structure 110 is corroded, it is preferable to remove a degraded section up to a depth of the reinforcing bar and to arrange an additional reinforcing bar if necessary.

The textile grid reinforcement 120 is adhered to a surface of the old concrete structure 110 in order to repair and reinforce the old concrete structure 110, and then is coated with a coating material in order to improve adhesiveness with the highly durable inorganic binder 130. Here, the coating material with which the textile grid reinforcement 120 is coated is an alumina ($Al_2O_3$) powder used as a sandpaper abrasive material, and a particle size of the coating material may be determined according to the type and specifications of the textile grid reinforcement 120.

The highly durable inorganic binder 130 is an inorganic binder, is mixed to have chloride penetration resistance performance or chemical resistance performance according to a use environment of the old concrete structure 110 and repair and reinforcement purposes, and adheres the textile grid reinforcement 120 to the old concrete structure 110.

As illustrated in FIG. 10A to 10C to be described below, the grid fixing unit 140 functions to fix the textile grid reinforcement 120, and is disposed such that the textile grid reinforcement 120 maintains a predetermined interval when the textile grid reinforcement 120 is placed on the old concrete structure 110. In this case, when the textile grid reinforcement 120 is placed, an anchor pin 141 of the grid fixing unit 140 is driven into the old concrete structure 110.

Specifically, as illustrated in FIG. 10A to 10C to be described below, the grid fixing unit 140 includes a U-shaped anchor pin 141 as a body driven into the old concrete structure 110, and a driving impact buffer 142 that is provided at an upper end of the anchor pin so as to protect the textile grid reinforcement 120 from a driving impact when the anchor pin 141 is driven. The grid fixing unit 140 passes through an upper portion of a grid weft and warp intersection when the textile grid reinforcement 120 is placed, and is fixedly driven into the old concrete structure 110. In this case, the grid fixing unit 140 is driven into the old concrete structure 110 by an explosive or pneumatic tacker, and enables the textile grid reinforcement 120 to be firmly fixed to the old concrete structure 110.

In the concrete structure 100 repaired and reinforced using a textile grid reinforcement and a highly durable inorganic binder according to an embodiment of the present invention, the highly durable inorganic binder 130 is preferably a chloride penetration resistant inorganic binder having chloride penetration resistance performance or a chemical resistant inorganic binder having chemical resistance performance.

Specifically, the chloride penetration resistant inorganic binder is obtained by mixing 100 parts of weight of cement, 100 parts of weight of a chloride penetration resistant binder, 210 to 250 parts of weight of fine aggregate, 55 to 65 parts of weight of mixing water, and 1.5 to 3 parts of weight of a high-performance water reducing admixture. The chloride penetration resistant binder is obtained by mixing 90 to 95 wt % of a fine blast furnace slag powder and 5 to 10 wt % of a salt adsorbent. The salt adsorbent is preferably calcium carbonate.

Further, the chemical resistant inorganic binder is a cement-free binder, and may be obtained by mixing 100 parts of weight of a fine blast furnace slag powder, 35 to 45 parts of weight of fly ash, 165 to 180 parts of weight of fine aggregate, 55 to 65 parts of weight of mixing water, and 8 to 20 parts of weight of an alkali accelerator (or an alkali activator).

Further, the concrete structure 100 repaired and reinforced using a textile grid reinforcement and a highly durable inorganic binder according to an embodiment of the present invention may be a dam, a harbor structure, a waste water facility, etc. as well as a bridge, a tunnel, a subway, etc. that are road and railroad facilities, but is not limited thereto.

Figure 6A:
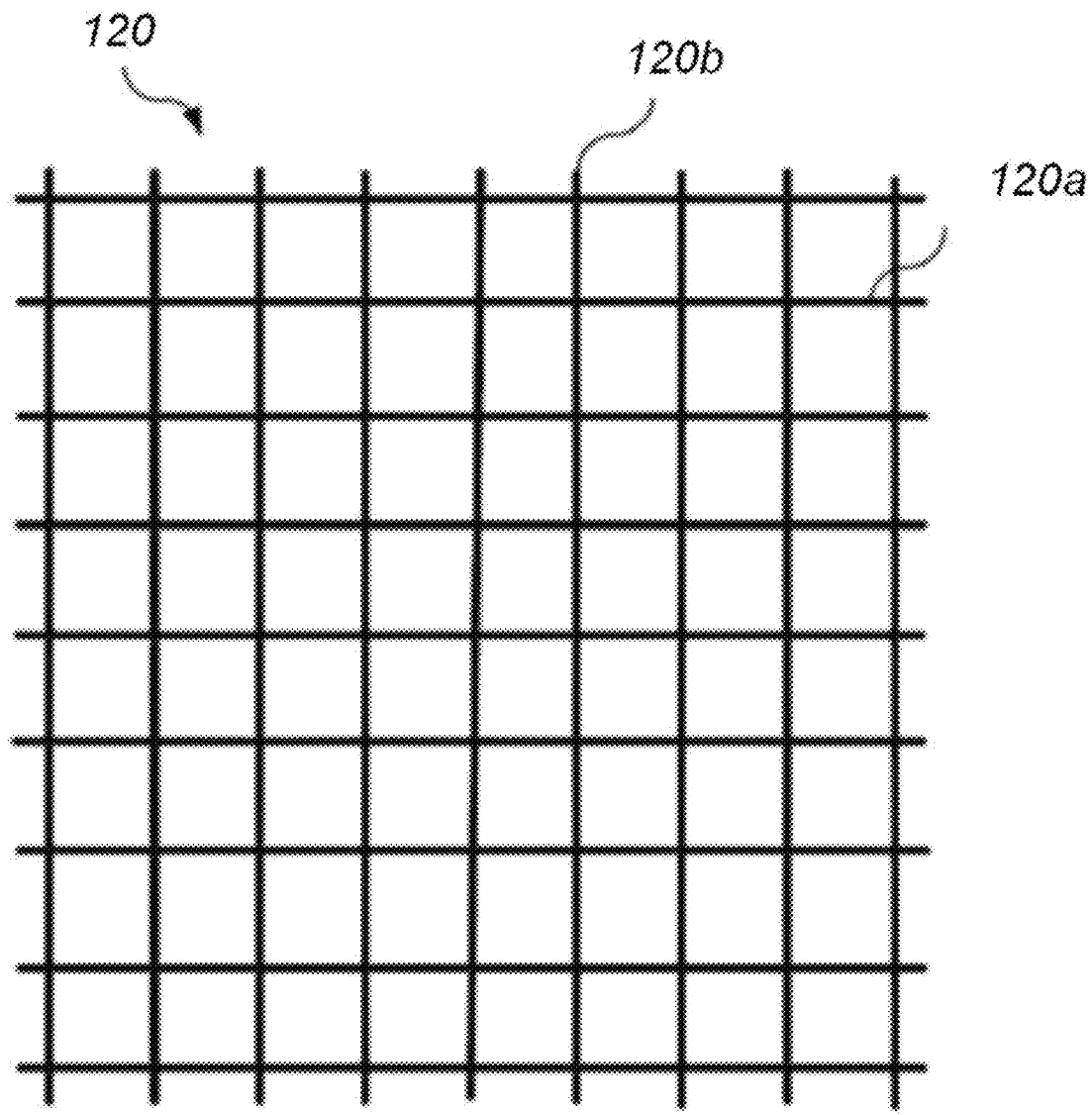
FIGS. 6A to 6C are views specifically illustrating a textile grid reinforcement.
Figure 6B:
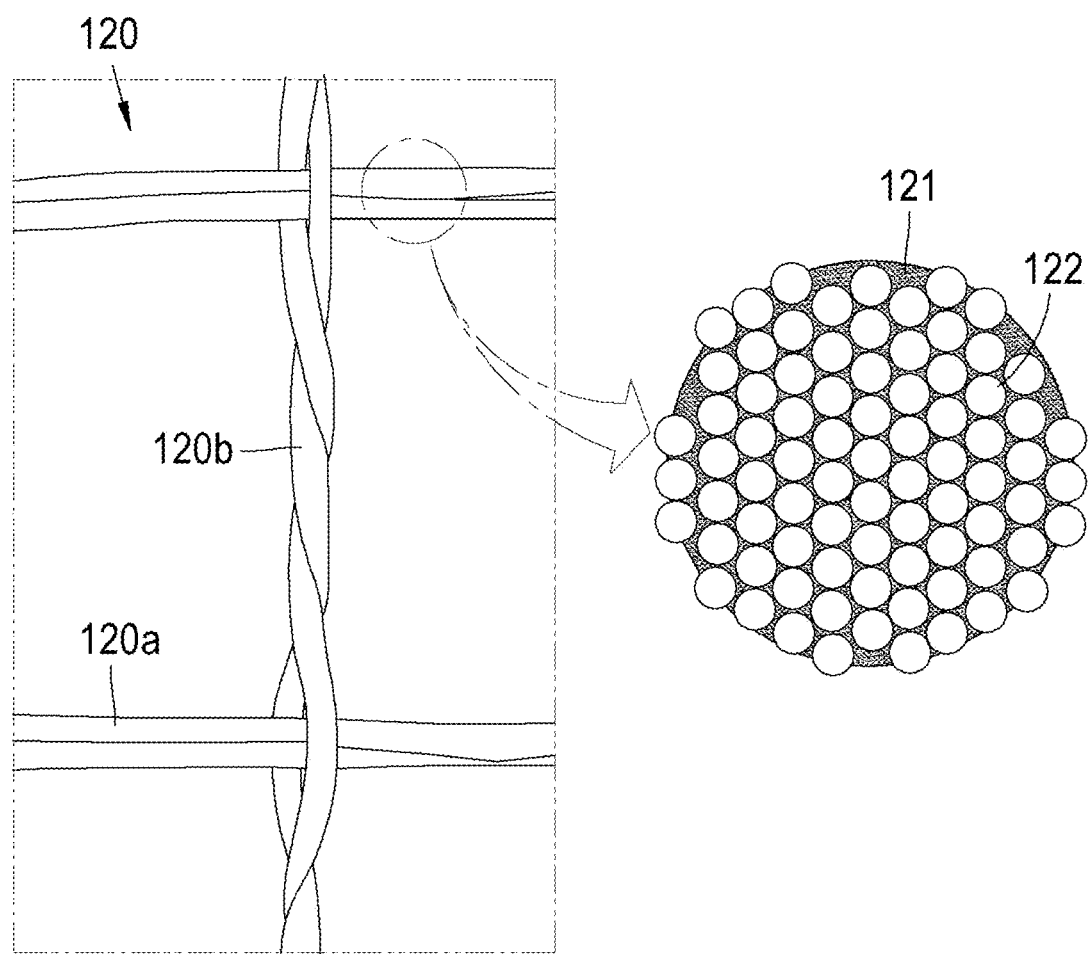
Figure 6C:
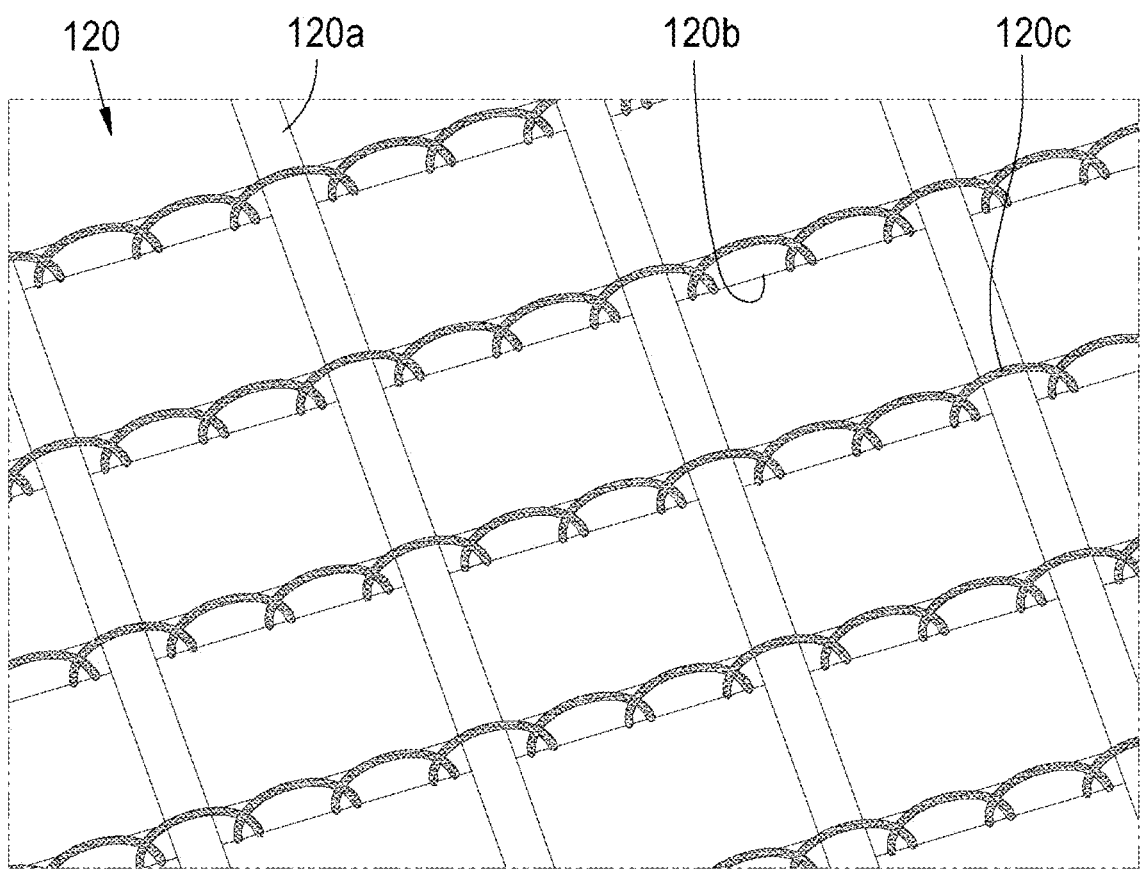
Figure 7A:
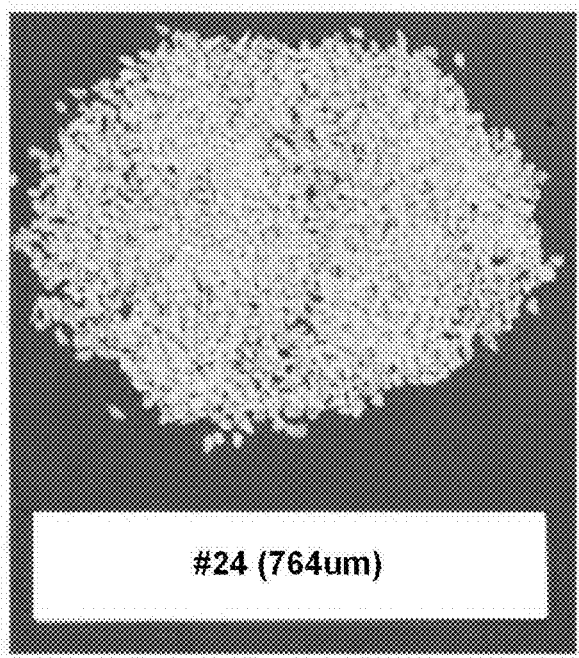
FIG. 7A to 7D are views illustrating types of particle sizes of an alumina powder that is a coating material with which a textile grid reinforcement is coated in the concrete structure repaired and reinforced using a textile grid reinforcement and a highly durable inorganic binder according to an embodiment of the present invention.
Figure 7B:
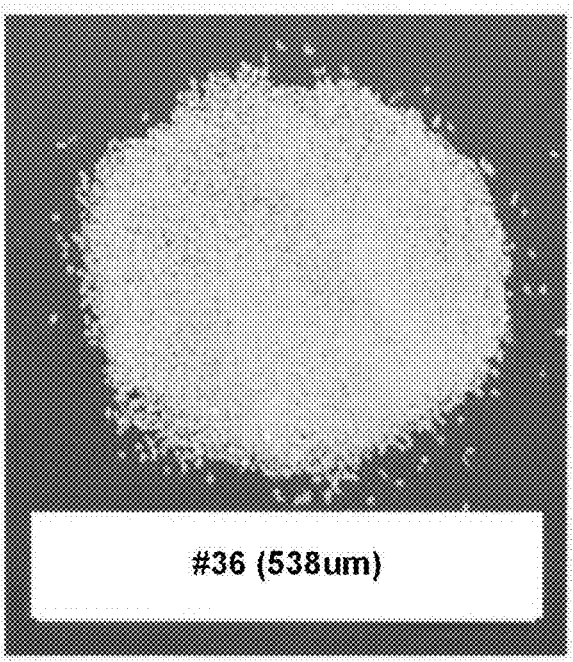
Figure 7C:
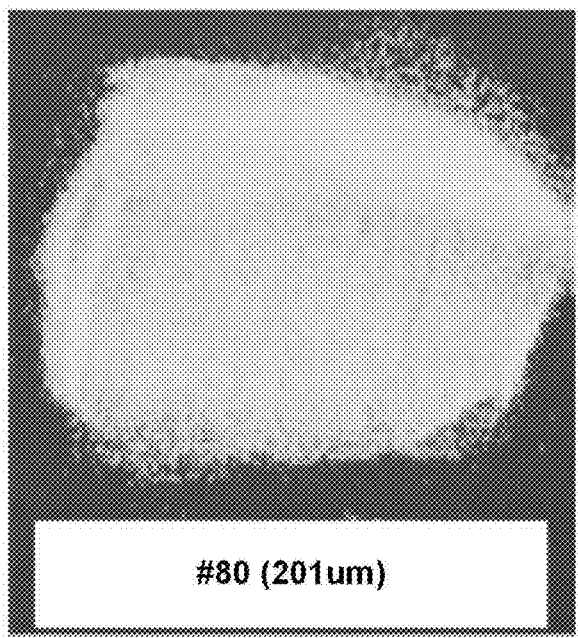
Figure 7D:
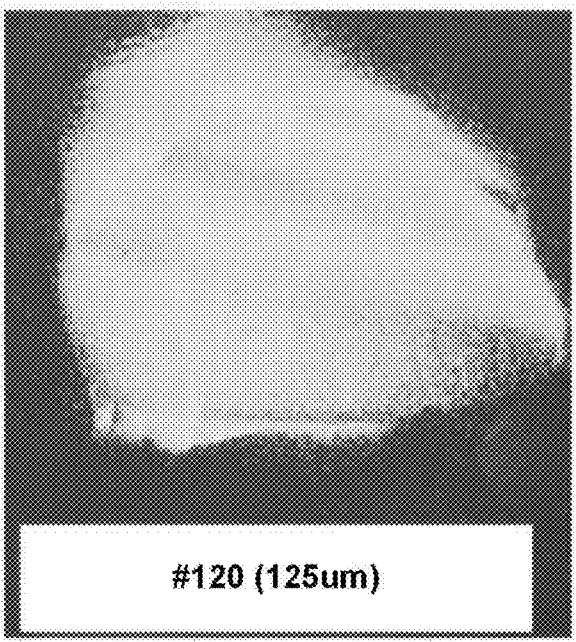

Meanwhile, FIGS. 6A to 6C are views concretely illustrating a textile grid reinforcement, wherein FIG. 6A illustrates a textile grid reinforcement, FIG. 6B is a view illustrating a textile grid reinforcement produced by a weaving method, and FIG. 6C is a view illustrating a textile grid reinforcement produced by a knitting method.

The textile grid reinforcement 120 is manufactured by manufacturing a textile grid in which a grid type textile is woven or knitted using a high-strength fiber such as a carbon fiber, an aramid fiber, or the like, and impregnating the textile grid with epoxy, polyester, acrylate, an SBR resin, or the like.

As illustrated in FIG. 6A, recently, the textile grid reinforcement 120 has been manufactured by manufacturing a textile grid in which a grid type textile is woven or knitted using a high-strength fiber such as a carbon fiber, an aramid fiber, or the like, and impregnating the textile grid with epoxy, vinyl ester, an SBR resin, or the like.

As illustrated in FIG. 6B, the textile grid reinforcement 120 consists of a weft 120a and a warp 120b. Each of the weft 120a and the warp 120b is impregnated with a fiber bundle 121 and a resin 122, but the completed textile grid reinforcement 120 has enough flexibility to be wound in a roll form. The textile grid reinforcement 120 produced by this weaving method has a characteristic that, because the warp 120b is woven by twisting, an elongation in a warp direction is greater than that in a weft direction of the weft 120a disposed in a straight line that is a main direction.

Further, as illustrated in FIG. 6C, the textile grid reinforcement 120 may be manufactured by sewing a binder yarn 120c, which is generally made of polyester, in a warp direction with the weft 120a and the warp 120b overlapping at a right angle to each other, which refers to a knitting method. This knitting method has an advantage that a textile grid manufacturing speed is faster than that of the weaving method.

Meanwhile, there is a slight difference according to the high-strength fiber to be used. However, since the textile grid made of a carbon fiber has weak adhesive strength with concrete, which is a one-third level of the reinforcing bar, in the case where the concrete structure reinforced with the textile grid is subjected to a load (stress) above the adhesive strength, there is a risk of slipping in which the textile grid partly slips inside a matrix (a solidified binder). Accordingly, in the case where adhesiveness between the matrix and the grid is lost, an integration action is of little use, and so a reinforcing effect caused by a composite action may not occur.

Accordingly, in the case of the concrete structure 100 repaired and reinforced using a textile grid reinforcement and a highly durable inorganic binder according to an embodiment of the present invention, the surface of the textile grid is coated with a abrasive material to improve the adhesive strength of the textile grid.

Figure 8:
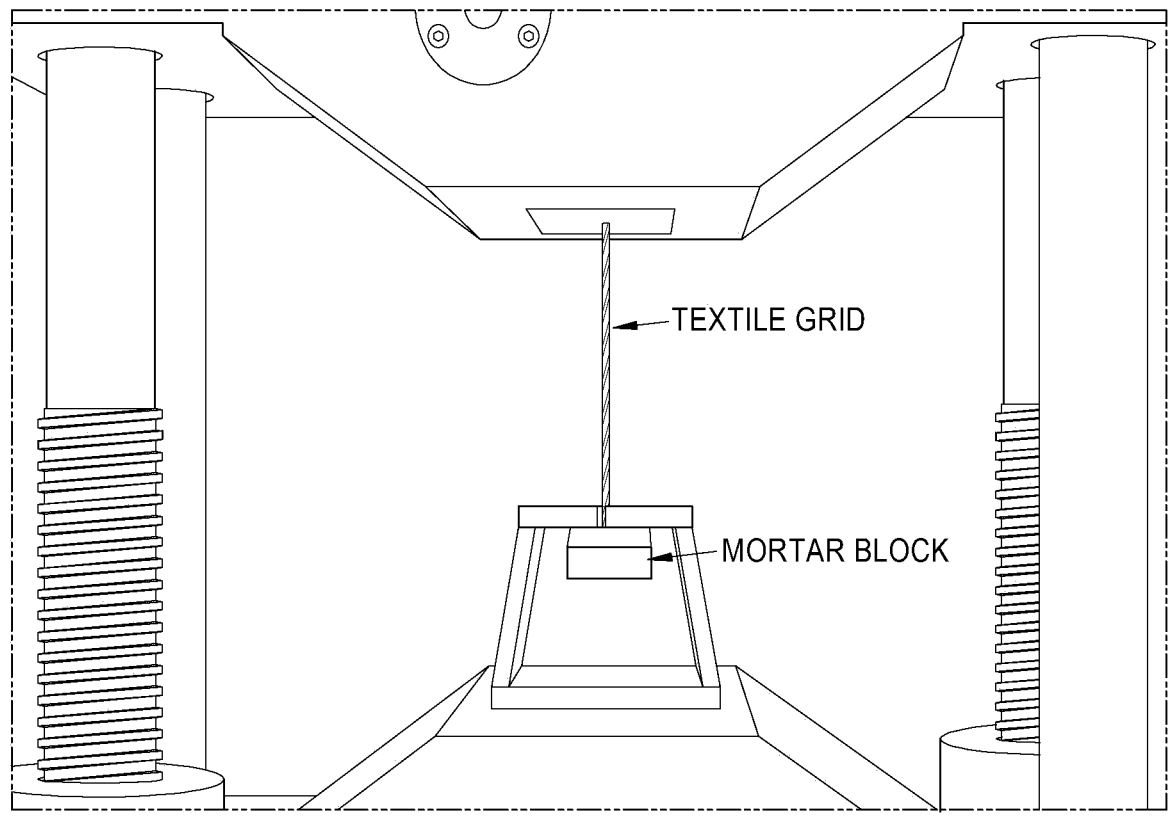
FIG. 8 is a view illustrating a direct pull-out test of a textile grid reinforcement in the concrete structure repaired and reinforced using a textile grid reinforcement and a highly durable inorganic binder according to an embodiment of the present invention.
Figure 9A:
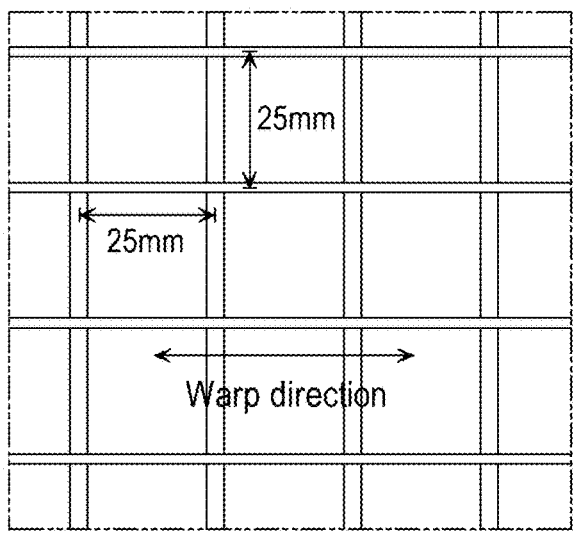
FIGS. 9A and 9B are views illustrating an uncoated textile grid reinforcement and a coated textile grid reinforcement in the concrete structure repaired and reinforced using a textile grid reinforcement and a highly durable inorganic binder according to an embodiment of the present invention.
Figure 9B:
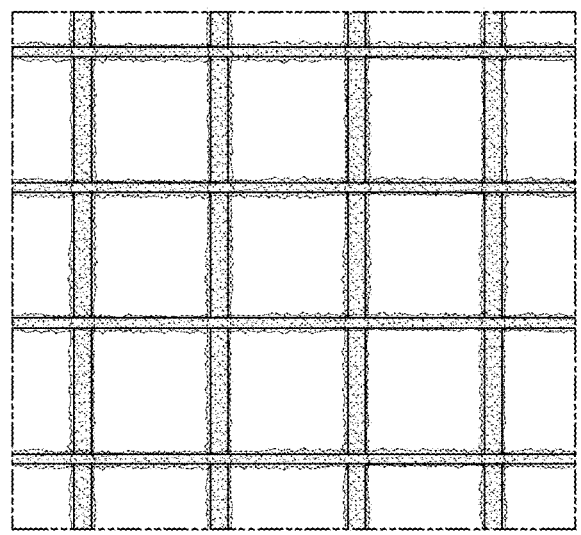

FIG. 7A to 7D are views illustrating types of particle sizes of an alumina powder that is a coating material with which a textile grid reinforcement is coated in the concrete structure repaired and reinforced using a textile grid reinforcement and a highly durable inorganic binder according to an embodiment of the present invention. FIG. 8 is a view illustrating a direct pull-out test of a textile grid reinforcement in the concrete structure repaired and reinforced using a textile grid reinforcement and a highly durable inorganic binder according to an embodiment of the present invention. FIGS. 9A and 9B are views illustrating an uncoated textile grid reinforcement and a coated textile grid reinforcement in the concrete structure repaired and reinforced using a textile grid reinforcement and a highly durable inorganic binder according to an embodiment of the present invention.

As illustrated in FIG. 7A to 7D, an alumina ($Al_2O_3$) powder used as a sandpaper abrasive material may be applied as the coating material, a particle size of the coating material may be determined according to the types and specifications of grid. For example, a small particle sized abrasive material is advantageous for coating a textile grid having small diameter yarn, and a large particle sized abrasive material is advantageous for coating a textile grid having large diameter yarn.

Further, as illustrated in FIG. 8, after a grid vinyl ester resin is applied and then an abrasive material is adsorbed and hardened, the grid is embedded in a mortar block. After the mortar is cured, a direct pull-out adhesive strength test is performed.

Specifically, as illustrated in FIG. 7A to 7D, after a grid is coated with an alumina powder having a total of four particle sizes, direct pull-out adhesive strength was measured and results thereof are shown in Table 1. According to the results shown in Table 1, the adhesive strength of the grid after coating of the abrasive material is increased two-fold compared to that before coating of the abrasive material.

In the embodiment of the present invention, a case in which a textile grid is coated with a #24 alumina powder to increase the adhesive strength of the textile grid is illustrated in FIGS. 9A and 9B. Further, Table 1 shows the results of the grid adhesive strength test for each particle size of the coated abrasive material. In the case where the textile grid is coated with a #80 alumina powder, the adhesive strength shows the largest rate of increase.

TABLE 1

| Type of specimen (Name of abrasive material) | Diameter of $Al_2O_3$ (mm) | Adhesive strength (MPa) | Rate of increase of adhesive strength (%) |
|---|---|---|---|
| Uncoated | — | 4.20 | — |
| Coated (#120) | 125 | 8.30 | 198 |
| Coated (#80) | 201 | 8.85 | 211 |
| Coated (#36) | 538 | 8.48 | 202 |
| Coated (#24) | 764 | 8.81 | 210 |

Meanwhile, in the case of constructing textile reinforced concrete (TRC) according to the related art, because there is no proper method capable of fixing a textile grid when the textile grid is placed on a concrete wall or a lower surface of a slab, construction is difficult, for instance, the textile grid falls off during construction. To solve this problem, in the case of the concrete structure repaired and reinforced using a textile grid reinforcement and a highly durable inorganic binder according to an embodiment of the present invention, the grid fixing unit 140 is used.

FIG. 10A to 10C are views specifically illustrating a grid fixing unit in the concrete structure repaired and reinforced using a textile grid reinforcement and a highly durable inorganic binder according to an embodiment of the present invention, wherein FIG. 10A illustrates that the grid fixing unit 140 is fixed to an upper end of an intersection at which the weft and warp of the textile grid reinforcement meet each other, and FIG. 10B illustrates a configuration and shape of the grid fixing unit 140. In this case, the grid fixing unit 140 is made up of an anchor pin 141 that is a body driven into the old concrete structure 110 after the textile grid reinforcement 120 is fixed, and a driving impact buffer 142 that is made of a plastic or polypropylene and protects the textile grid reinforcement 120 from a driving impact when the anchor pin 141 is driven. FIG. 10C illustrates a state in which the anchor pin 141 passes through the driving impact buffer 142. In this case, it is preferable that a length of the anchor pin 141 is determined according to a thickness of a mortar layer, and a length of the driving impact buffer 142 is larger than a width of the anchor pin 141 and has a thickness of about 2 mm.

Specifically, the anchor pin 141 is formed of a high-strength corrosion resistant metal material such as stainless steel, and a portion thereof driven into the old concrete structure 110 is made sharp so as to be easily driven into the old concrete structure 110. For example, when the textile grid reinforcement 120 is placed, the grid fixing unit 140 is installed at horizontal and vertical intervals of 20 cm to 30 cm, and thus textile grid reinforcement 120 can be firmly fixed to a surface of the old concrete structure 110.

Meanwhile, in the case of constructing the TRC according to the related art, typical cement mortar or concrete is used. In this case, despite an advantage that the TRC can be constructed at a thin thickness of 20 mm, the TRC should be constructed to be thicker than necessary due to low durability of the mortar, and thus there is a disadvantage that economical efficiency is low because material costs and construction costs are increased or a usage space after the reinforcement is reduced.

Hereinafter, the highly durable inorganic binder in the case of the concrete structure repaired and reinforced using a textile grid reinforcement and a highly durable inorganic binder according to an embodiment of the present invention will be described in detail. In this case, according to a use environment of an old concrete structure to which the method of repairing and reinforcing a concrete structure according to an embodiment of the present invention is applied, a chloride penetration resistant binder and a chemical resistant binder may be provided and selectively applied.

Figure 13:
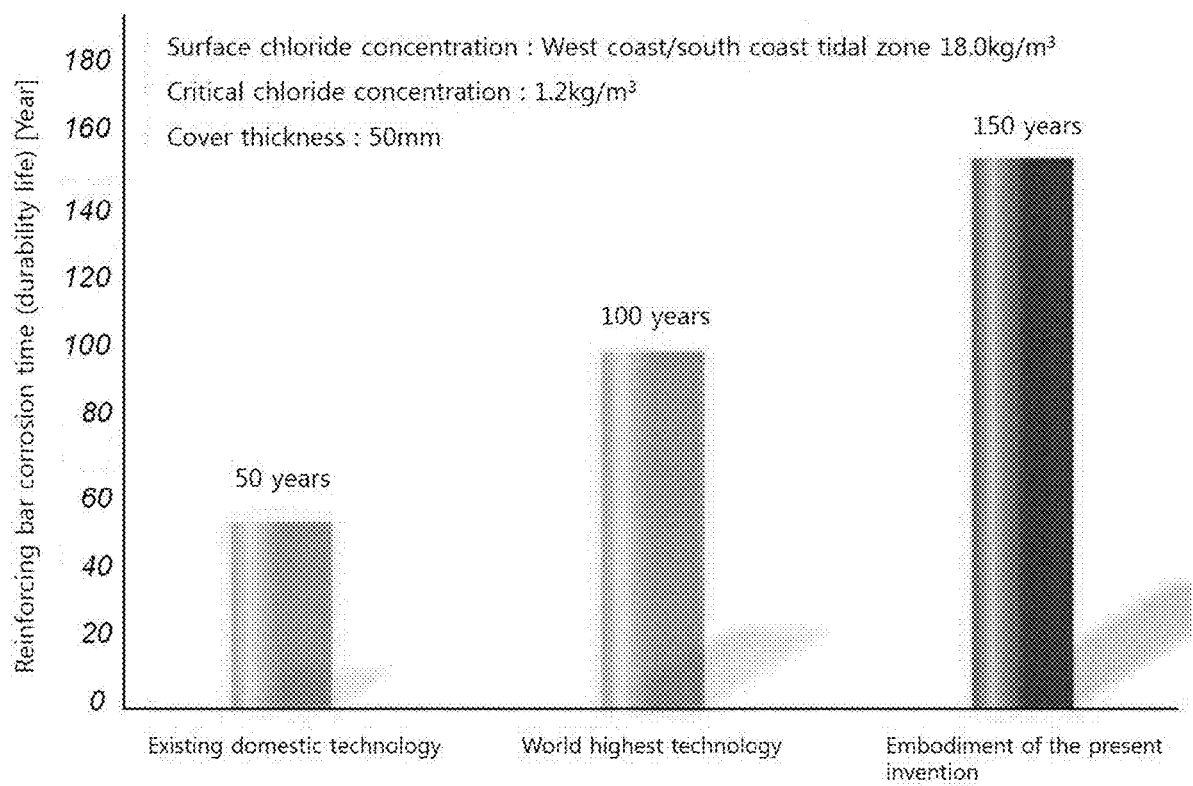
FIG. 13 is a view illustrating reinforcing bar corrosion time evaluation results for evaluating chloride penetration performance with respect to the concrete structure repaired and reinforced using a textile grid reinforcement and a highly durable inorganic binder according to an embodiment of the present invention.
Figure 14:
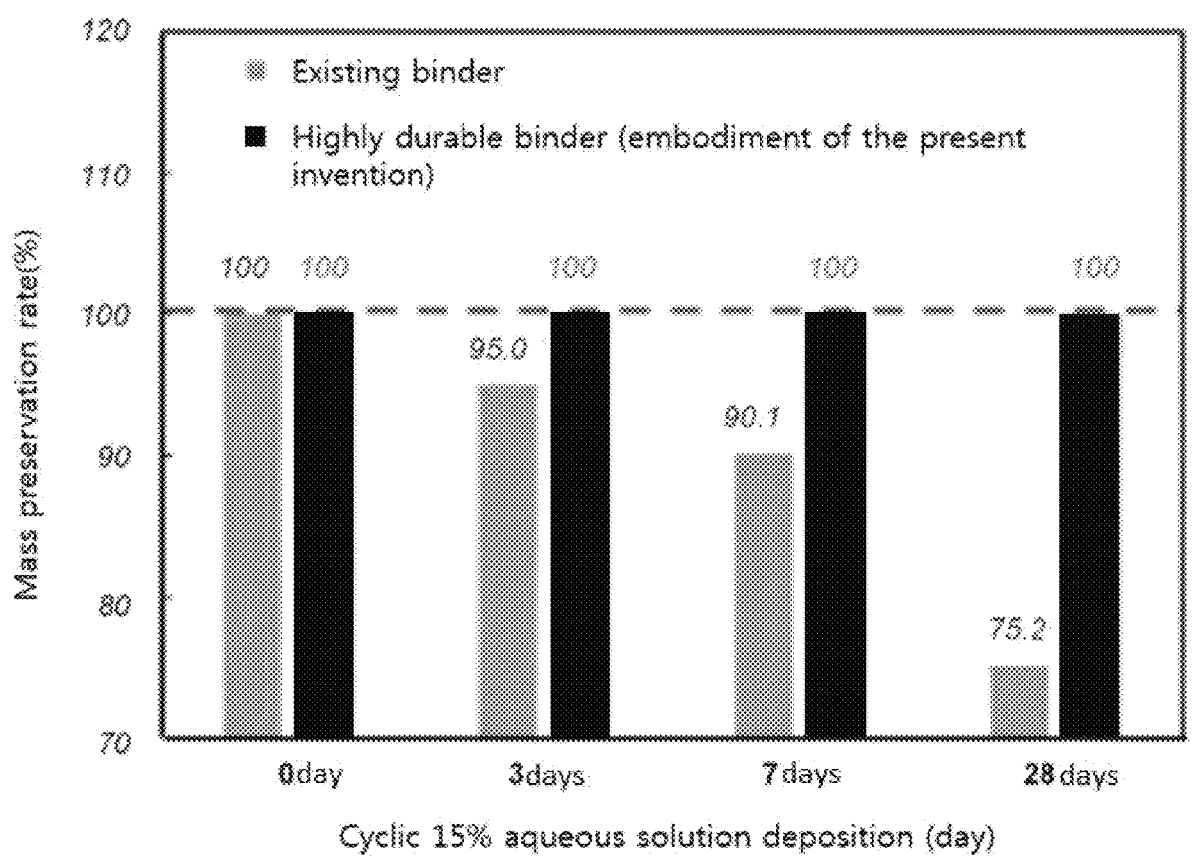
FIG. 14 is a view illustrating results of evaluating chemical resistant performance with respect to the concrete structure repaired and reinforced using a textile grid reinforcement and a highly durable inorganic binder according to an embodiment of the present invention.

FIG. 11 is a view illustrating a composition of a chloride penetration resistant mortar in the concrete structure repaired and reinforced using a textile grid reinforcement and a highly durable inorganic binder according to an embodiment of the present invention, and FIG. 12 is a view illustrating a composition of chemical resistant mortar in the concrete structure repaired and reinforced using a textile grid reinforcement and a highly durable inorganic binder according to an embodiment of the present invention. Further, FIG. 13 is a view illustrating reinforcing bar corrosion time evaluation results for evaluating chloride penetration performance with respect to the concrete structure repaired and reinforced using a textile grid reinforcement and a highly durable inorganic binder according to an embodiment of the present invention, and FIG. 14 is a view illustrating results of evaluating chemical resistant performance with respect to the concrete structure repaired and reinforced using a textile grid reinforcement and a highly durable inorganic binder according to an embodiment of the present invention.

First, in a degradation and damage mechanism of a reinforced concrete structure exposed to a chloride penetration environment, chloride, that is, chloride ions penetrate from a surface of the reinforced concrete structure into the inside of the reinforced concrete structure to accelerate corrosion of reinforcing bars, and when the reinforcing bar is corroded, a surface area of the reinforcing bar is increased by up to 2.5 times by rust, and a crack occurs in a concrete cover, so that the concrete cover may be peeled from the reinforced concrete structure due to expansion pressure. Further, when the concrete cover is peeled, the chloride penetration is accelerated, which causes the corrosion of reinforcing bars to rapidly progress.

Specifically, the chloride penetration resistant binder according to an embodiment of the present invention is based on a principle that the binder forms a dense structure to significantly reduce a speed at which the chloride ions pass through the inside of the binder (a penetration speed) compared to ordinary concrete or an ordinary binder when applied to the concrete structure as a reinforcement material, thereby delaying the time taken for the chloride ions to reach the reinforcing bar, and thus greatly improving a durability life of the concrete structure. For example, a corrosion time of a reinforcing bar in a structure that is constructed at a concrete cover thickness of 50 mm by applying current Korean reinforced concrete design standards and concrete specifications is about 50 years.

As an embodiment of the present invention, the chloride penetration resistant inorganic binder is developed through an optimum mixing design considering a variety of highly durable materials as shown in Table 2, and Table 2 shows a mixing table for a chloride penetration resistant binder (in units of $kg/m^3$).

TABLE 2

| Cement | Chloride penetration resistant binder | Fine aggregate | Water | High-performance water reducing admixture |
|---|---|---|---|---|
| 466 | 466 | 1,024 | 278 | 7 |

The chloride penetration resistant binder according to an embodiment of the present invention is composed of 90 to 95 wt % of a fine blast furnace fine powder, which is a byproduct in the steel industry, and 5 to 10 wt % of a salt adsorbent composed of calcium carbonate. A chloride ion migration test (NT Build 492) of international test standards is performed on the chloride penetration resistant binder according to an embodiment of the present invention, and as a result of analyzing test results to estimate the corrosion time of the reinforcing bar, the corrosion time is analyzed to be at a level of about 150 years as illustrated in FIG. 13.

Therefore, in the case of performing TRC repairing and reinforcing on structures, such as marine and harbor structures, which have concerns about damage caused by chloride penetration, using a chloride penetration resistance performance binder according to an embodiment of the present invention, it is confirmed that a durability life increased up to three times can be secured compared to applying a binder according to the related art.

Meanwhile, sewage and wastewater facilities such as sewage facilities, wastewater treatment facilities, etc. made of a cement pipe and a concrete pipe that is mainly produced using cement are exposed to oxygen ($O_2$) and hydrogen sulfide ($H_2S$) caused by anaerobic bacteria generated due to sewage and wastewater. For this reason, due to sulfuric acid ($H_2SO_4$) and bad sewage, a concrete structure is subjected to, for instance, chemical erosion, and degradation thereof is accelerated to reduce a durability life thereof, and internal reinforcing bars thereof are rapidly corroded.

In the case of the concrete structure using a textile grid reinforcement and a highly durable inorganic binder according to an embodiment of the present invention, to improve chemical resistance performance of a binder applied to, for instance, sewage and wastewater facilities, a cement-free binder using an alkali activator rather than cement is provided. Table 3 shows a mixing table for a highly durable binder with chemical resistance performance (in units of $kg/m^3$).

TABLE 3

| W/B | B/S | Act./W | Fine blast furnace slag powder | Fly ash | Fine aggregate | Water | Alkali accelerator |
|---|---|---|---|---|---|---|---|
| 0.45 | 1.2 | 0.24 | 259 | 111 | 444 | 167 | 40 |

As illustrated in FIG. 14, in the concrete structure using a textile grid reinforcement and a highly durable inorganic binder according to an embodiment of the present invention, to evaluate performance of the highly durable binder with chemical resistance performance, an existing cement binder and a concrete specimen made of the highly durable binder with chemical resistance performance according to an embodiment of the present invention are immersed in a 15% sulfuric acid solution for 28 days and then their weight was measured, and the results are shown. According to the test results, the weight of the existing cement binder is reduced by about 25%, but the weight of the highly durable binder of the present invention is not reduced due to excellent chemical resistance performance.

Finally, according to an embodiment of the present invention, a textile grid reinforcement that is coated with a coating material and improves adhesiveness is adhered to an old concrete structure, but a highly durable inorganic binder having chloride penetration resistance performance or chemical resistance performance is selectively used to adhere the textile grid reinforcement according to a use environment and a reinforcement purpose, and thereby an old concrete structure can be easily repaired and reinforced. That is, a textile grid reinforcement is adhered using an inorganic binder such as cement in place of an organic adhesive, and thereby an old concrete structure can be easily repaired and reinforced.

Figure 15:
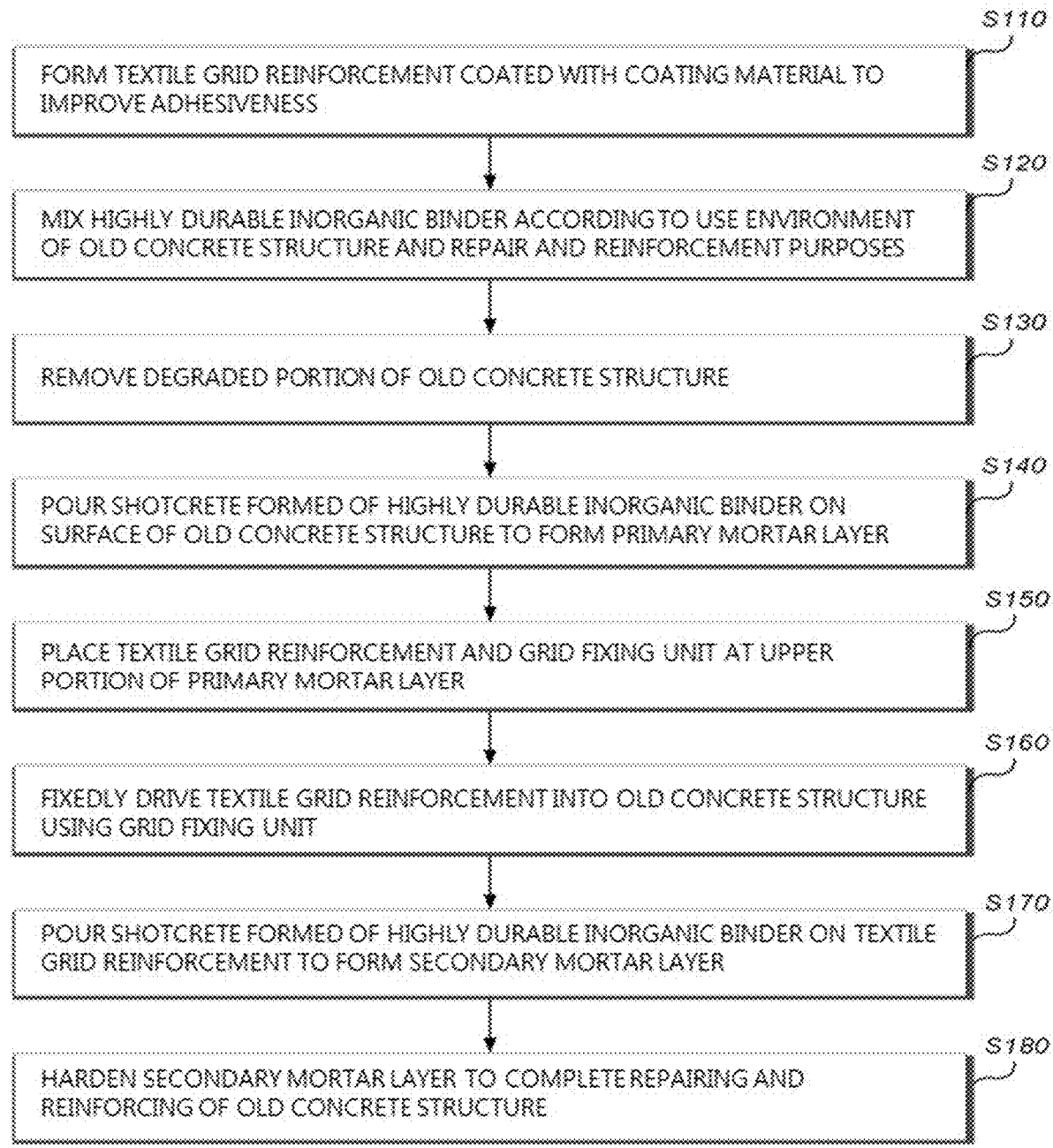
FIG. 15 is a process flow chart illustrating a method of repairing and reinforcing a concrete structure using a textile grid reinforcement and a highly durable inorganic binder according to an embodiment of the present invention.

(First Embodiment) Method of Repairing and Reinforcing Concrete Structure Using Textile Grid Reinforcement and Highly Durable Inorganic Binder FIG. 15 is a process flow chart illustrating a method of repairing and reinforcing a concrete structure using a textile grid reinforcement and a highly durable inorganic binder according to a first embodiment of the present invention, and FIGS. 16A to 16D are views specifically illustrating the method of repairing and reinforcing a concrete structure using a textile grid reinforcement and a highly durable inorganic binder according to an embodiment of the present invention, respectively.

As illustrated in FIG. 4 described above, the method of repairing and reinforcing a concrete structure using a textile grid reinforcement and a highly durable inorganic binder according to an embodiment of the present invention is an old concrete structure repairing and reinforcing method of embedding and constructing the textile grid reinforcement 120, which is a fiber reinforcement that is generally made on the surface of the old concrete structure 110 in a grid shape, in the highly durable inorganic binder 130. Here, the highly durable inorganic binder 130 serves as an adhesive. Concrete constructed by this method is generally referred to as textile reinforced concrete (TRC).

Referring to FIG. 15, a method of repairing and reinforcing a concrete structure using a textile grid reinforcement and a highly durable inorganic binder according to a first embodiment of the present invention forms a textile grid reinforcement 120 coated with a coating material to improve adhesiveness with an old concrete structure 110 (S110). In this case, the coating material is an alumina ($Al_2O_3$) powder used as a sandpaper abrasive material, and a particle size of the coating material may be determined according to the type and specifications of the textile grid reinforcement 120.

Next, a highly durable inorganic binder 130 is mixed and made according to a use environment of the old concrete structure 110 and repair and reinforcement purposes (S120).

Next, in the case where a degraded portion is present in the old concrete structure 110, the degraded portion is pre-removed from the old concrete structure 110 (S130). Here, in the case where a reinforcing bar embedded in the old concrete structure 110 is corroded, it is preferable that a degraded cross section is removed up to a depth of the reinforcing bar, and an additional reinforcing bar is arranged if necessary.

Figure 16A:
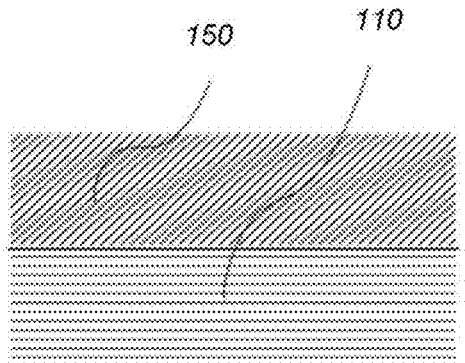
FIG. 16A to 16D are views specifically illustrating the method of repairing and reinforcing a concrete structure using a textile grid reinforcement and a highly durable inorganic binder according to an embodiment of the present invention.

Next, as illustrated in FIG. 16A, shotcrete formed of the highly durable inorganic binder 130 is poured on the surface of the old concrete structure 110, and a primary mortar layer 150 is formed (S140).

Figure 16B:
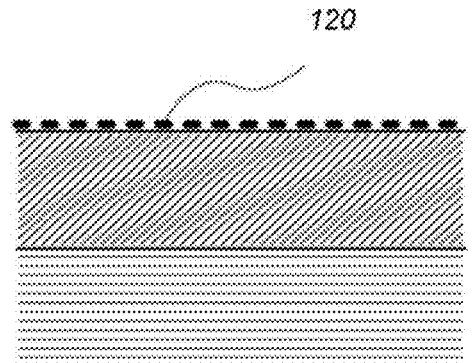

Next, the textile grid reinforcement 120 and the grid fixing unit 140 are placed at an upper portion of the primary mortar layer 150 (S150). More specifically, as illustrated in FIG. 16B, the grid fixing unit 140 is a body driven into the old concrete structure 110, and includes the U-shaped anchor pin 141 and the a driving impact buffer 142 that is provided at an upper end of the anchor pin so as to protect the textile grid reinforcement 120 from a driving impact when the anchor pin 141 is driven. The grid fixing unit 140 passes through an upper portion of a grid weft and warp intersection when the textile grid reinforcement 120 is placed, and is fixedly driven into the old concrete structure 110. In this case, the grid fixing unit 140 is driven into the old concrete structure 110 by an explosive or pneumatic tacker, and enables the textile grid reinforcement 120 to be firmly fixed to the old concrete structure 110.

Figure 16C:
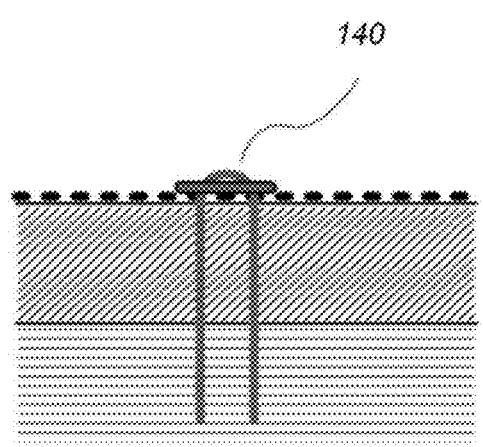

Next, the textile grid reinforcement 120 is fixed to the old concrete structure 110 using the grid fixing unit 140 (S160). More specifically, as illustrated in FIG. 16C, the grid fixing unit 140 is driven into the old concrete structure 110 by an explosive or pneumatic tacker, and enables the textile grid reinforcement 120 to be firmly fixed to the old concrete structure 110. If the primary mortar layer 150 is hardened enough to support the placed textile grid reinforcement 120, the textile grid reinforcement 120 can be fixed to the hardened primary mortar layer 150 by adjusting a driven depth of the grid fixing unit 140.

Figure 16D:
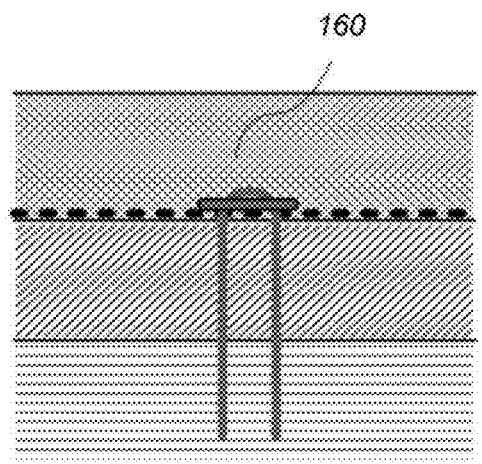

Next, as illustrated in FIG. 16D, the shotcrete formed of the highly durable inorganic binder 130 is poured on the old concrete structure 110, and forms a secondary mortar layer 160 (S170). In this case, the textile grid reinforcement 120 is preferably pulled from both sides thereof to introduce a tensile force such that the textile grid reinforcement 120 is horizontally maintained.

Next, the secondary mortar layer 160 is hardened to complete repairing and reinforcing of the old concrete structure 110 (S180).

In the method of repairing and reinforcing a concrete structure using a textile grid reinforcement and a highly durable inorganic binder according to an embodiment of the present invention, the highly durable inorganic binder 130 may be a chloride penetration resistant inorganic binder having chloride penetration resistance performance or a chemical resistant inorganic binder having chemical resistance performance.

Specifically, the chloride penetration resistant inorganic binder is made by mixing 100 parts of weight of cement, 100 parts of weight of a chloride penetration resistant binder, 210 to 250 parts of weight of fine aggregate, 55 to 65 parts of weight of mixing water, and 1.5 to 3 parts of weight of a high-performance water reducing admixture. In this case, the chloride penetration resistant binder is made by mixing 90 to 95 wt % of a fine blast furnace slag powder and 5 to 10 wt % of a salt adsorbent, and the salt adsorbent is preferably calcium carbonate.

Further, the chemical resistant inorganic binder is a cement-free binder, and may be made by mixing 100 parts of weight of a fine blast furnace slag powder, 35 to 45 parts of weight of fly ash, 165 to 180 parts of weight of fine aggregate, 55 to 65 parts of weight of mixing water, and 8 to 20 parts of weight of an alkali accelerator.

Figure 17:
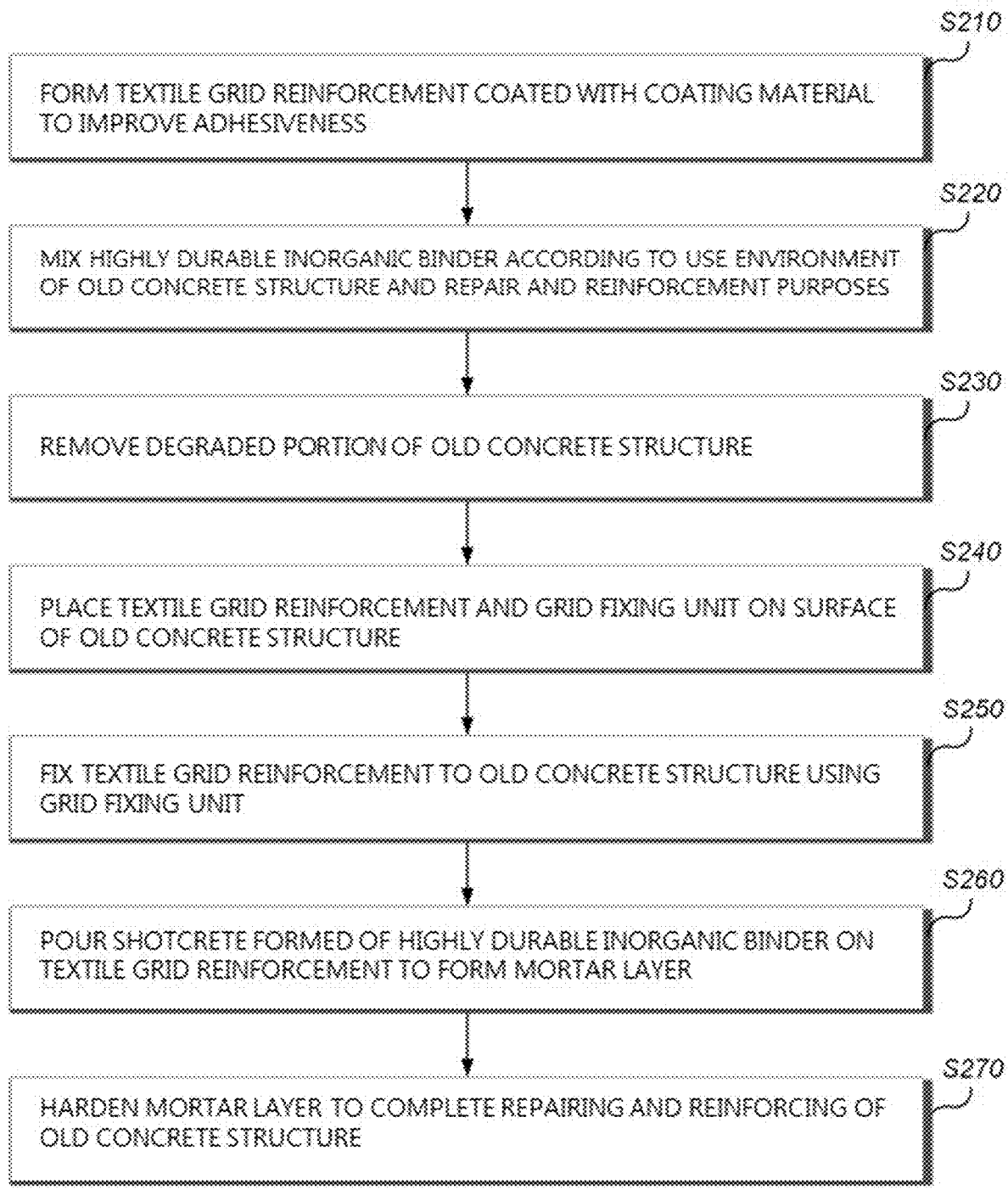
FIG. 17 is a process flow chart illustrating a method of repairing and reinforcing a concrete structure using a textile grid reinforcement and a highly durable inorganic binder according to another embodiment of the present invention.

(Second Embodiment) Method of Repairing and Reinforcing Concrete Structure Using Textile Grid Reinforcement and Highly Durable Inorganic Binder FIG. 17 is a process flow chart illustrating a method of repairing and reinforcing a concrete structure using a textile grid reinforcement and a highly durable inorganic binder according to a second embodiment of the present invention.

Referring to FIG. 17, first, a method of repairing and reinforcing a concrete structure using a textile grid reinforcement and a highly durable inorganic binder according to a second embodiment of the present invention forms the textile grid reinforcement 120 coated with a coating material to improve adhesiveness with the old concrete structure 110 (S210).

Next, a highly durable inorganic binder 130 is mixed and made according to a use environment of the old concrete structure 110 and repair and reinforcement purposes (S220).

Next, in the case where a degraded portion is present in the old concrete structure 110, the degraded portion is pre-removed from the old concrete structure 110 (S230).

Next, the textile grid reinforcement 120 and the grid fixing unit 140 are placed on a surface of the old concrete structure 110 (S240), and then the textile grid reinforcement 120 is fixed to the old concrete structure 110 using the grid fixing unit 140 (S250).

Next, shotcrete formed of the highly durable inorganic binder 130 is poured on the textile grid reinforcement 120, and a mortar layer in which the textile grid reinforcement 120 is embedded is formed (S260).

Next, the mortar layer is hardened to complete repairing and reinforcing of the old concrete structure 110 (S270).

In the case of the method of repairing and reinforcing a concrete structure using a textile grid reinforcement and a highly durable inorganic binder according to a second embodiment of the present invention, in comparison with the above-mentioned method of repairing and reinforcing a concrete structure using a textile grid reinforcement and a highly durable inorganic binder according to a first embodiment of the present invention, after the textile grid reinforcement 120 is pre-fixed to the surface of the old concrete structure 110 using the grid fixing unit 140, the mortar is constructed en bloc to a required thickness.

Figure 18:
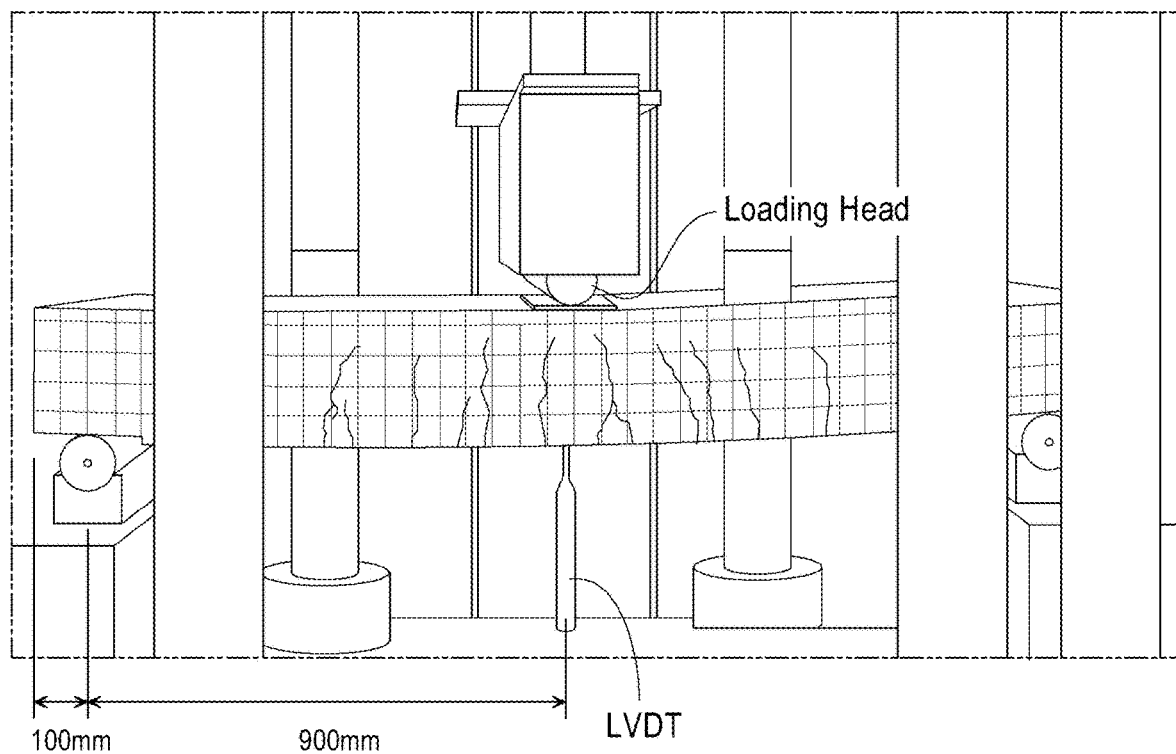
FIG. 18 is a view illustrating a fracture test of a concrete slab that is a concrete structure repaired and reinforced by the method of repairing and reinforcing a concrete structure using a textile grid reinforcement and a highly durable inorganic binder according to an embodiment of the present invention.

Meanwhile, FIG. 18 is a view illustrating a fracture test of a concrete slab that is a concrete structure repaired and reinforced by the method of repairing and reinforcing a concrete structure using a textile grid reinforcement and a highly durable inorganic binder according to an embodiment of the present invention.

To verify a performance improving effect of the method of repairing and reinforcing a concrete structure using a textile grid reinforcement and a highly durable inorganic binder according to an embodiment of the present invention, after a lower surface of a reinforced concrete slab (reinforcing bar reinforcement ratio=0.004) formed with a length of 2 m, a width of 1 m, and a thickness of 20 cm was reinforced by TRC having a thickness of 20 mm, the fracture test was performed using a universal loading test machine illustrated in FIG. 18. Table 4 shows results of the fracture test.

TABLE 4

| Test specimen | Crack initiation load (kN) | Fracture load (kN) | Rate of increase of fracture load (%) |
|---|---|---|---|
| Unreinforced | 39.20 | 180.45 | — |
| Reinforced one ply grid | 79.68 | 270.06 | 150 |
| Reinforced two ply grid | 78.22 | 374.01 | 207 |

According to the fracture test results shown in Table 4, in the case of a test specimen having a reinforced one ply grid, a crack initiation load is increased to 200%, and a fracture load is increased to 150% compared to an unreinforced slab test specimen. In the case of a test specimen having a reinforced two ply grid, a crack initiation load is increased to 200%, and a fracture load is increased to 207% compared to an unreinforced slab test specimen. Therefore, it can be seen from the TRC reinforcing method of the present invention that a structural performance improving effect was very large despite reinforcing with only a thickness of 20 mm.

Finally, according to an embodiment of the present invention, because both the textile grid reinforcement (the fiber reinforcement) such as a carbon fiber and the highly durable inorganic binder are incombustible materials, refractory performance is excellent, and particularly the present invention can be applied to reinforcing facilities exposed to the danger of fire. Further, according to an embodiment of the present invention, the inorganic binder that can be constructed for a wet structure or in the winter season is used, and thereby the problem of the adhering method according to the related art can be solved, for instance, the concrete structure does not fall off despite a leakage of water. Especially, because the textile grid reinforcement (the fiber reinforcement) such as a carbon fiber is not corroded like the reinforcing bar, road facilities on which a snow-removing agent is used or marine and harbor facilities such as a breakwater exposed to salt can be effectively repaired and reinforced.

The above description of the present invention is for illustration, and those having ordinary knowledge in the art to which the present invention pertains should understand that the embodiments of the present invention can be easily modified in other specific forms without changing the technical spirit or essential characteristics of the present invention. Therefore, it should be understood that the embodiments described above are illustrative and non-restrictive in every aspect. For example, components described in a single form may be implemented in a dispersed form, and similarly components described in a dispersed form may be implemented in a combined form.

The scope of the present invention is defined by the claims to be described below rather than the detailed description. It should be interpreted that all the modifications and alterations derived from the meanings and scope of the claims and their equivalents are included in the scope of the present invention.

What is claimed is:

1. A method of repairing and reinforcing a concrete structure using a textile grid reinforcement and a highly durable inorganic binder, the method comprising:
    a) forming a textile grid reinforcement coated with a coating material to improve adhesiveness with an old concrete structure;
    b) mixing and making a highly durable inorganic binder according to a use environment of the old concrete structure and repair and reinforcement purposes;
    c) pouring shotcrete formed of the highly durable inorganic binder on a surface of the old concrete structure to form a primary mortar layer;
    d) placing the textile grid reinforcement at an upper portion of the primary mortar layer;
    e) fixing the textile grid reinforcement to the old concrete structure using a grid fixing unit;
    f) pouring shotcrete formed of the highly durable inorganic binder on the textile grid reinforcement to form a secondary mortar layer; and
    g) hardening the secondary mortar layer to complete repairing and reinforcing of the old concrete structure,
    wherein the highly durable inorganic binder of the operation b) is a chloride penetration resistant inorganic binder having chloride penetration resistance performance or a chemical resistant inorganic binder having chemical resistance performance,
    wherein the grid fixing unit of the operation d) comprises:
    a U-shaped anchor pin as a body driven into the old concrete structure, and
    a driving impact buffer provided at an upper end of the anchor pin so as to protect the textile grid reinforcement from a driving impact when the anchor pin is driven; and
    the grid fixing unit passes through an upper portion of a grid weft and warp intersection when the textile grid reinforcement is placed, and is fixedly driven into the old concrete structure.

2. The method of claim 1, wherein, in the case where a degraded portion is present in the old concrete structure, the degraded portion is pre-removed from the old concrete structure prior to performing the operation c), and in the case where a reinforcing bar embedded in the old concrete structure is corroded, a degraded cross section is removed up to a depth of the reinforcing bar, and an additional reinforcing bar is arranged.

3. The method of claim 1, wherein:
    the coating material of the operation a) is an alumina ($Al_2O_3$) powder used as a sandpaper abrasive material, and a particle size of the coating material is determined according to the type and specifications of the textile grid reinforcement; and
    the chloride penetration resistant inorganic binder is formed by mixing 100 parts of weight of cement, 100 parts of weight of a chloride penetration resistant binder, 210 to 250 parts of weight of fine aggregate, 55 to 65 parts of weight of mixing water, and 1.5 to 3 parts of weight of a high-performance water reducing admixture.

4. The method of claim 3, wherein the chloride penetration resistant binder is formed by mixing 90 to 95 wt % of a fine blast furnace slag powder and 5 to 10 wt % of a salt adsorbent, and the salt adsorbent is calcium carbonate.

5. The method of claim 1, wherein the chemical resistant inorganic binder is a cement-free binder, and is formed by mixing 100 parts of weight of a fine blast furnace slag powder, 35 to 45 parts of weight of fly ash, 165 to 180 parts of weight of fine aggregate, 55 to 65 parts of weight of mixing water, and 8 to 20 parts of weight of an alkali accelerator.

6. The method of claim 1, wherein:
    before the operation e), the textile grid reinforcement is pulled from both sides thereof to introduce a tensile force such that the textile grid reinforcement is horizontally maintained; and
    in the operation e), the grid fixing unit is driven into the old concrete structure by an explosive or pneumatic tacker such that the textile grid reinforcement is firmly fixed to the old concrete structure.

7. A method of repairing and reinforcing a concrete structure using a textile grid reinforcement and a highly durable inorganic binder, the method comprising:
    a) forming a textile grid reinforcement coated with a coating material to improve adhesiveness with an old concrete structure;
    b) mixing and making a highly durable inorganic binder according to a use environment of the old concrete structure and repair and reinforcement purposes;
    c) placing the textile grid reinforcement on a surface of the old concrete structure;
    d) fixing the textile grid reinforcement to the old concrete structure using a grid fixing unit;
    e) pouring shotcrete formed of the highly durable inorganic binder on the textile grid reinforcement to form a mortar layer in which the textile grid reinforcement is embedded; and
    f) hardening the mortar layer to complete repairing and reinforcing of the old concrete structure,
    wherein the highly durable inorganic binder of the operation b) is a chloride penetration resistant inorganic binder having chloride penetration resistance performance or a chemical resistant inorganic binder having chemical resistance performance,
    wherein the grid fixing unit of the operation d) comprises:
    a U-shaped anchor pin as a body driven into the old concrete structure, and a driving impact buffer provided at an upper end of the anchor pin so as to protect the textile grid reinforcement from a driving impact when the anchor pin is driven; and the grid fixing unit passes through an upper portion of a grid weft and warp intersection when the textile grid reinforcement is placed, and is fixedly driven into the old concrete structure.

8. A concrete structure repaired and reinforced using a textile grid reinforcement and a highly durable inorganic binder, the concrete structure comprising:

an old concrete structure to be repaired and reinforced;

a textile grid reinforcement adhered to a surface of the old concrete structure to repair and reinforce the old concrete structure and coated with a coating material to improve adhesiveness with the surface of the old concrete structure;

a highly durable inorganic binder mixed as an inorganic binder so as to have chloride penetration resistance performance or chemical resistance performance according to a use environment of the old concrete structure and repair and reinforcement purposes, and configured to adhere the textile grid reinforcement to the old concrete structure; and a grid fixing unit configured to fix the textile grid reinforcement when the textile grid reinforcement is placed on the old concrete structure, wherein the highly durable inorganic binder is a chloride penetration resistant inorganic binder having chloride penetration resistance performance or a chemical resistant inorganic binder having chemical resistance performance, wherein the grid fixing unit comprises a U-shaped anchor pin as a body driven into the old concrete structure, and a driving impact buffer provided at an upper end of the anchor pin so as to protect the textile grid reinforcement form a driving impact when the anchor pin is driven;

the grid fixing unit passes through an upper portion of a grid weft and warp intersection when the textile grid reinforcement is placed, and is fixedly driven into the old concrete structure;

the grid fixing unit is driven into the old concrete structure by an explosive or pneumatic tacker such that the textile grid reinforcement is firmly fixed to the old concrete structure; and the old concrete structure is a concrete structure from which a degraded portion is pre-removed, and in the case where a reinforcing bar embedded in the old concrete structure is corroded, a degraded cross section is removed up to a depth of the reinforcing bar, and an additional reinforcing bar is arranged.

9. The concrete structure of claim 8, wherein:

the coating material with which the textile grid reinforcement is coated is an alumina ($Al_2O_3$) powder used as a sandpaper abrasive material, and a particle size of the coating material is determined according to the type and specifications of the textile grid reinforcement;

the chloride penetration resistant inorganic binder is formed by mixing 100 parts of weight of cement, 100 parts of weight of a chloride penetration resistant binder, 210 to 250 parts of weight of fine aggregate, 55 to 65 parts of weight of mixing water, and 1.5 to 3 parts of weight of a high-performance water reducing admixture;

the chloride penetration resistant binder is formed by mixing 90 to 95 wt % of a fine blast furnace slag powder and 5 to 10 wt % of a salt adsorbent, and the salt adsorbent is calcium carbonate; and the chemical resistant inorganic binder is a cement-free binder, and is formed by mixing 100 parts of weight of a fine blast furnace slag powder, 35 to 45 parts of weight of fly ash, 165 to 180 parts of weight of fine aggregate, 55 to 65 parts of weight of mixing water, and 8 to 20 parts of weight of an alkali accelerator.

\* \* \* \* \*